United States Patent
Helter et al.

(10) Patent No.: US 9,565,227 B1
(45) Date of Patent: Feb. 7, 2017

(54) COMPOSITION CONTROL METHOD FOR REMOTE APPLICATION DELIVERY

(71) Applicant: Teradici Corporation, Burnaby (CA)

(72) Inventors: Paul Andrew Helter, Coquitlam (CA); David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 171 days.

(21) Appl. No.: 14/306,084

(22) Filed: Jun. 16, 2014

(51) Int. Cl.
*G06F 15/16* (2006.01)
*H04L 29/06* (2006.01)

(52) U.S. Cl.
CPC ............ *H04L 65/60* (2013.01); *H04L 67/42* (2013.01)

(58) Field of Classification Search
USPC .......................................................... 709/217
See application file for complete search history.

(56) References Cited

U.S. PATENT DOCUMENTS

| | | |
|---|---|---|
| 6,694,379 B1 | 2/2004 | Hanko et al. |
| 7,657,837 B2 | 2/2010 | Shappir et al. |
| 8,108,799 B2 | 1/2012 | Brugiolo et al. |
| 8,111,086 B2 | 2/2012 | Desai |
| 8,341,270 B2 | 12/2012 | Mazzaferri et al. |
| 8,484,325 B1 * | 7/2013 | Maity .................... H04L 43/50 709/217 |
| 2005/0146598 A1 * | 7/2005 | AbiEzzi ................. H04N 7/142 348/14.01 |
| 2006/0069797 A1 * | 3/2006 | Abdo ................. H04L 65/4084 709/231 |
| 2007/0174410 A1 | 7/2007 | Croft et al. |
| 2010/0106798 A1 | 4/2010 | Barreto et al. |
| 2010/0162127 A1 * | 6/2010 | Uchino ................. G06F 3/1454 715/740 |
| 2010/0254603 A1 | 10/2010 | Rivera |
| 2011/0225512 A1 | 9/2011 | Lauwers et al. |
| 2011/0225542 A1 * | 9/2011 | Schmieder ............ G06F 3/0481 715/794 |
| 2012/0331032 A1 * | 12/2012 | Balachandran ....... H04L 69/164 709/202 |
| 2013/0013664 A1 | 1/2013 | Baird et al. |
| 2013/0060886 A1 * | 3/2013 | Wynn ..................... H04L 67/40 709/217 |
| 2013/0063482 A1 | 3/2013 | Moncayo et al. |
| 2013/0067344 A1 * | 3/2013 | Ungureanu ............. G06F 3/048 715/740 |
| 2013/0219012 A1 | 8/2013 | Suresh et al. |

* cited by examiner

*Primary Examiner* — Alicia Baturay
(74) *Attorney, Agent, or Firm* — Moser Taboada

(57) ABSTRACT

A method for communicating an image stream, one embodiment comprising negotiating, between a server and client, an MTCC identifying: a window as a portion of a display of the client, and an occluded portion of the window defined by the client; generating, by the server, complying with the MTCC, a sequence of image frames each comprising pixel data in a portion of the frame identified by the occluded portion; transmitting an encoding of a first frame of the sequence not including an encoding of the pixel data in the portion of the first frame; identifying, by the server, an event associated with the sequence; and transmitting, before communication between the server and the client regarding the event, by the server, information of the event in conjunction with an encoding of a second frame of the sequence including an encoding of the pixel data in the portion of the second frame.

14 Claims, 15 Drawing Sheets

1400

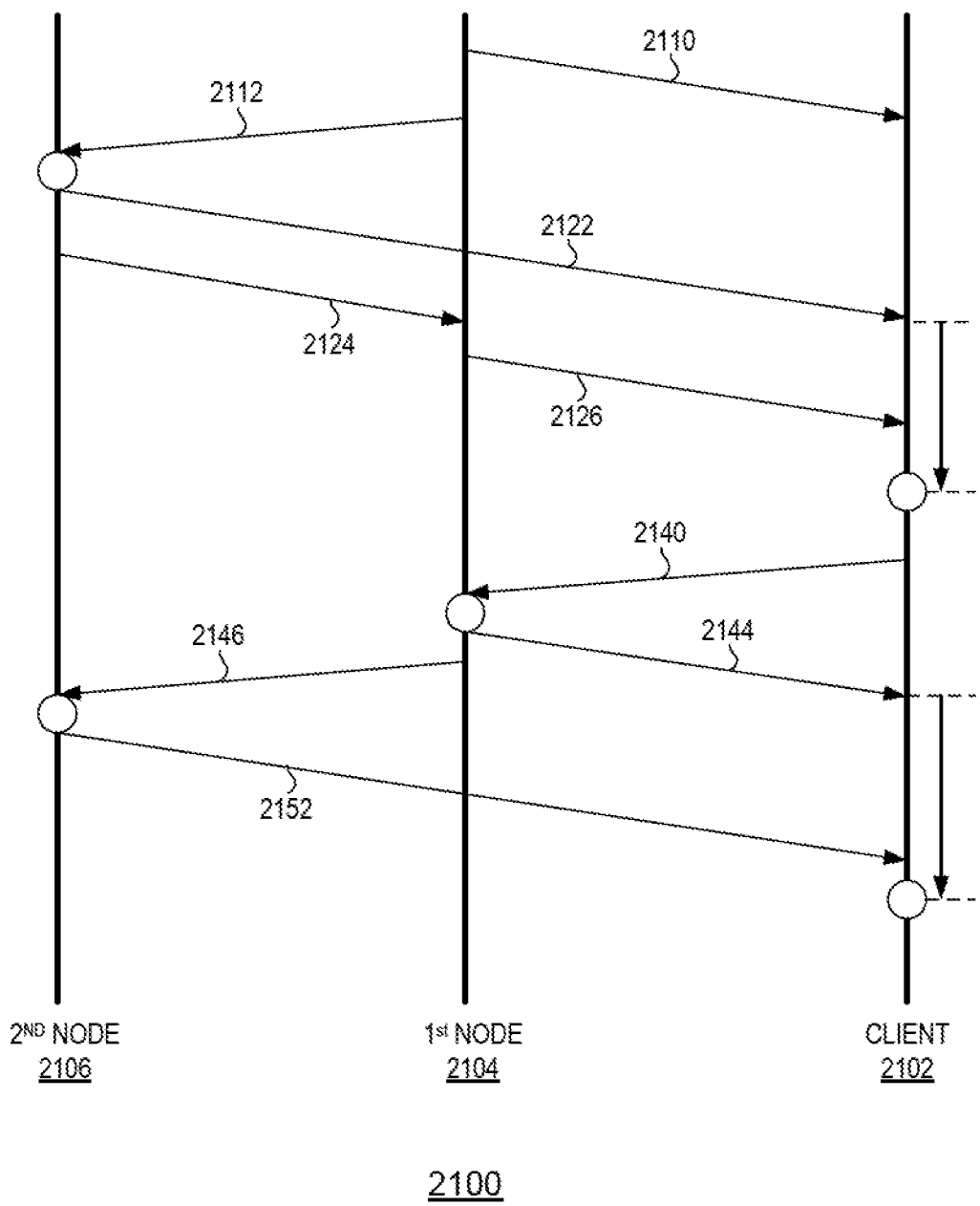

COMPOSITION CONTROL METHOD FOR REMOTE APPLICATION DELIVERY

CROSS-REFERENCE TO RELATED APPLICATIONS

This patent application references U.S. patent application Ser. No. 13/653,073 entitled "Method for Client Configuration Management in Remote Computing" filed Oct. 16, 2012 which is herein incorporated by reference in its entirety. This patent application also references U.S. patent application Ser. No. 12/838,058 entitled "Switch-Initiated Congestion Management Method" filed Jul. 16, 2010 which is herein incorporated by reference in its entirety and U.S. patent application Ser. No. 13/653,073 entitled "Method for Client Configuration Management in Remote Computing" filed Oct. 16, 2012 which is herein incorporated by reference in its entirety.

BACKGROUND OF THE INVENTION

Field of the Invention

Embodiments of the present invention relate generally to a method and apparatus for controlling the delivery of remote applications and desktops to client computers.

Description of the Related Art

A traditional Desktop Windows Manager (DWM) provides compositing functions between multiple image buffers allocated to software applications on one side of the DWM and a composite image buffer on the other (display) side. In remote computing systems, the compositing function may be located at the client end of a network to leverage the compositing engine capabilities inherent to some client computers. In some graphical user interface (GUI) environments, visual tree descriptors that define window positions and z-order are provided by each node connected to a client. The client reconstructs a remote visual tree corresponding to a desktop composition and renders content in compliance with the remote visual tree. In conventional multi-media redirection (MMR) architectures, the location definition for individual windows of a hosted desktop or hosted application may be extracted from the composed desktop and keyed which allows the client to compose media content in the corresponding region within the client composition.

Rapid market adoption of Virtualized Desktop Infrastructure (VDI) and application publishing schemes has accelerated the diversity of architectures in which the desktop presented to a user at a client has become an assembly of hosted desktops, hosted applications and streaming media content generated by multiple servers. Each such server comprises a unique set of capabilities and performance attributes and all are coupled to the client by networks of varying bandwidth limitations and latency characteristics.

Therefore, there is a need in the art for efficiently managing transport and composition of media in general and image sequences in particular such that the impact of the distributed nature of content assembly has minimum effect on user experience.

SUMMARY OF THE INVENTION

Embodiments of the present invention generally relate to a method and apparatus for controlling the delivery of remote applications and desktops to a client computer as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 21 illustrates a communications sequence associated with an image composition synchronization process.

DETAILED DESCRIPTION

Embodiments of the present invention generally relate to the composition of a remote desktop under management of distributed composition control. A network of transport and composition control elements and associated control schema is dynamically reconfigured according to changes in transport and composition requirements as determined by factors such as performance, resource allocation and/or network access changes.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The invention encompasses all possible modifications and variations within the scope of the issued claims.

The term 'desktop resource' as used herein generally refers to a computer enabled for remote access by a client device. The computer provides a 'remote desktop' (alternatively termed a 'hosted desktop' in some embodiments) such as a MICROSOFT WINDOWS desktop or 'remote applications' (alternatively termed 'hosted applications' or 'published applications' in some embodiments). A desktop resource may be virtualized using Virtualized Desktop Infrastructure (VDI) technology, or a shared desktop provided by a Remote Desktop Shared Host (RDSH) terminal server or a personal computer (PC) such as a workstation or blade PC enabled for remote access.

The term 'session' as used herein generally refers to a computing connection between a client such as a computer, thin client, mobile device or zero client and one or more desktop resources. Such a session may include voice or video communications between the client and a voice or video client elsewhere on the network in concurrence with a remote computing connection between the client and the desktop resource.

The term 'client' as used herein generally refers to a computing platform which is directly utilized by a user to participate in a remote access sessions with desktops and/or application servers. The client may include voice or video telephony capabilities such as a SIP client, webcam and the like.

The term "interface grade" as used herein refers to the quality, degree of synchronization and responsiveness of a user interface, including one or more sensory combinations of visual, audio, touch, smell and taste experiences in response to events and/or composition rules.

Figure 1:
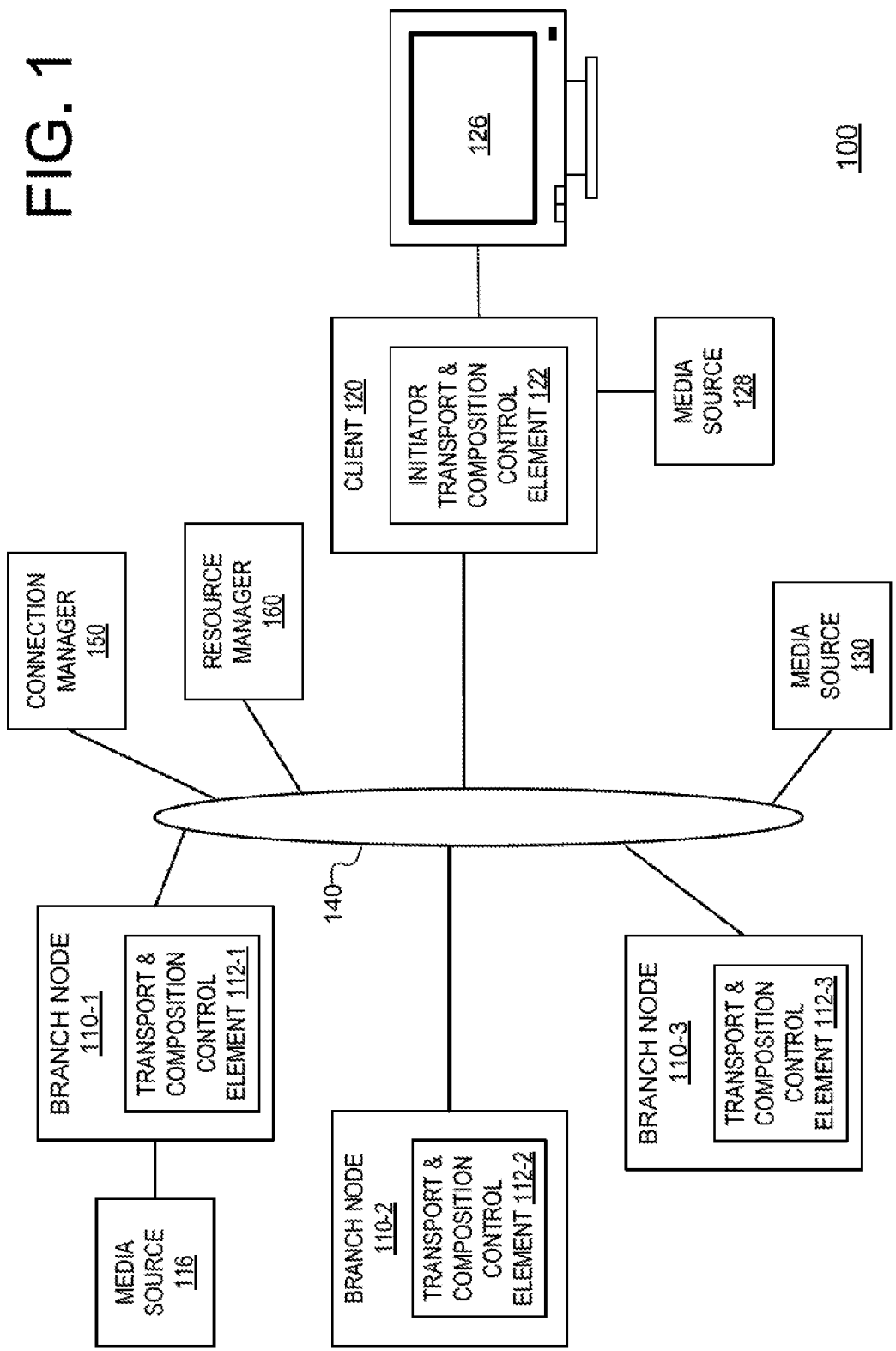
FIG. 1 illustrates selected details of an embodiment of a system comprising branch nodes and a client with composition control elements coupled to a network.

In one or more embodiments of the present invention, a computing system, such as system 100 in FIG. 1, comprises a network of a plurality of transport and composition control elements (TCCEs), shown as a TCCE 112-1, a TCCE 112-2 and an initiator TCCE 122, coupled to a network 140 and jointly configured to manage the composition of a display image presented at a client 120 (i.e., at a display of the client 120) by continuously responding to changes in composition requirements, requesting composition priorities aligned with user preferences and/or administrative policies, and anticipating future compositions with a view to optimize user interactivity.

In various embodiments, each TCCE operates under transport and composition rules and a media transport and composition configuration (MTCC) that serve to optimize interactivity by requesting changes to the client desktop composition based on real time events local to the TCCE, local composition priorities, and anticipated future client desktop compositions. Rather than negotiating changes to the client-held MTCC or waiting for the client-held MTCC to be propagated upstream, each node responds to real time events by sending MTCC parameters as a request in conjunction with content associated with the requested composition change. The client is enabled to accept or reject such requests using the current client MTCC as a basis for client priorities; historic usage patterns the client real-time knowledge of user input events. Such an approach described by the present invention avoids round trip network delays and improves the user experience over traditional techniques. Furthermore, MTCC configurations provide an ability for a user to manage a diversity of simultaneous content streams (e.g. computer applications, unified communications, streaming media etc.) received from a diversity of computer platforms (e.g. home computer, work computer, hosted computer, phones, tablets, home appliances, security systems, electronic health or baby monitors etc.) by learning user preferences and delivering information important to the user in the best possible manner. TCCEs also manage audio data, streaming media, peripheral device data and the like associated with a remote computing session as generated or consumed by one or more branch nodes 110, media sources or client 120. Composition functions (CF) which are not depicted in FIG. 1 are located at client 120 and branch nodes 110 and operate to compose and/or redirect media content.

FIG. 1 illustrates selected details of an embodiment of a computing system 100 ("system 100") comprising branch nodes 110-1, 110-2 and 110-3 (collectively referred to as branch nodes 110), each comprising a corresponding TCCE 112-1, TCCE 112-2 and TCCE 112-3 (collectively referred to as TCCEs 112); and a client 120, comprising with initiator TCCE 122, coupled to a network 140. In an embodiment, system 100 is a corporate enterprise network comprising desktop resources such as hosted desktops, application servers, branch appliances or personal computers (PC), any of which may be represented as a branch node (BN) 110. A user of system 100 may access a (BN) 110 from a client 120 with at least one display 126.

In an embodiment, the TCCEs 112 and 122 each comprise machine executable instructions stored in suitable memory and configured to execute the processes 1300 and 1800 described below. In some embodiments, selective functions of TCCEs 112 and/or the initiator TCCE 122 are executed by one or more separate processors (e.g. virtual appliances) attached to network 140 to provide distributed functionality. For example, in an embodiment, some functions of initiator TCCE 122 are executed by the processor of client 120 and other functions are executed by other processors such as servers, virtual appliances or BNs attached to the network 140.

In some embodiments, system 100 comprises one or more media sources such as media source 116 coupled to a BN 110-1, media source 128 coupled to client 120 or media source 130 coupled to network 140. In an embodiment, the media source 116 comprises a multimedia file such as an encoded movie file (e.g. H.264 or MPEG-2 format) on a storage medium such as disk storage attached to BN 110. In another embodiment, the media source 116 comprises content (e.g. image data or audio data) generated by an application local to the BN 110-1. In an embodiment, the media source 130 comprises network-accessible media such as a media server, video conferencing system or storage system enabled for streaming real time or file-based encoded media onto network 140. In another embodiment, the media source 130 comprises a gateway (e.g. a router or IP/PBX gateway) to a remote unified communications (UC) endpoint. The media source 128 comprises one or more peripheral devices such as a webcam or microphone or storage medium and media files coupled to the client 120 enabled to provide media such as encoded video and/or audio. Such media may be made available to software of client 120 or redirected to a BN 110 under TCCE control.

The network 140 comprises a communication system (e.g., the Internet, local area network (LAN), wireless LAN, wide area network (WAN), and the like). Connection manager 150 is coupled to the network 140 and provides well-known connection brokering resources, including a database of registered BNs (such as the BNs 110 and processing functions for aiding the establishment and reconfiguration of network paths between BNs 110 and client 120. Resource manager 160 is a server, appliance or processing function coupled to network 140 which maintains a list of transport, composition and processing resources; e.g. media codec types, graphic processing resources, graphic processing compatibility and CPU processing performance of each BN 110, including policies and status information. The resource manager 160 may be an independent processor, a processing function of connection manager 150 or a distributed function associated with one or more BNs 110 and/or client 120 used to identify the resource load of the BN's within or on a single session or multi-session connection path. Resource management may be distributed on a per-session basis or distributed in association with a set of media sessions (i.e. on a multi-session basis). In some distributed embodiments in which the connection management and/or resource management is decentralized such that each session/connection is managed independently, the client 120 or one or more BNs 110 execute TCCE-related resource management functions.

Figure 2:
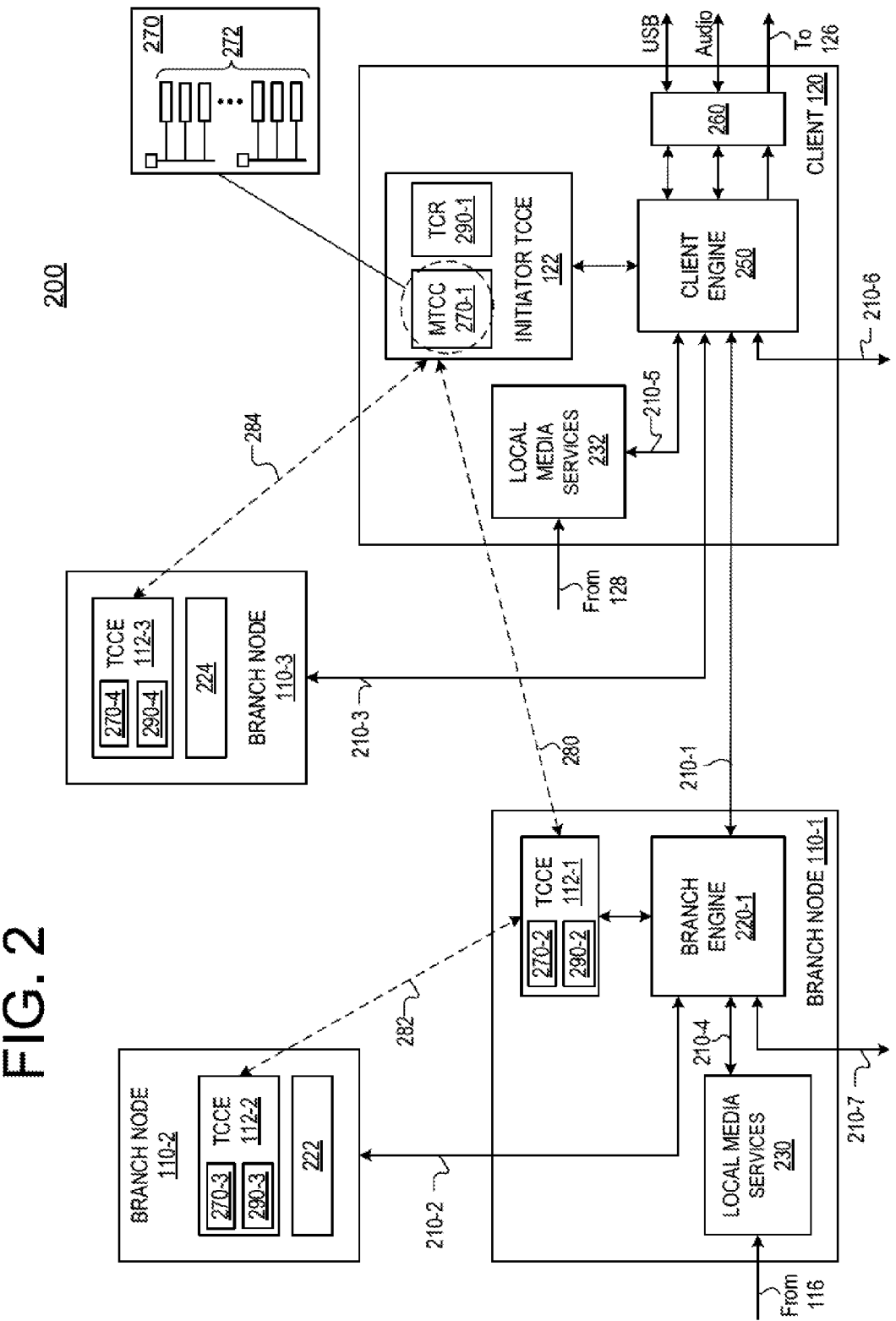
FIG. 2 illustrates selected details of an initiator composition control element at a client in communications with child composition control elements of branch nodes.

FIG. 2 illustrates media and control schema 200 for an embodiment of system 100. BN 110-1 and BN 110-3 operate as child nodes to client 120. BN 110-1 further operates as the parent node to BN 110-2 (i.e. in an embodiment BN 110-2 is an 'upstream server' with respect to server BN 110-1). The schema 200 comprises the client 120 with a media connection 210-1 to BN 110-1, BN 110-1 with a media connection 210-2 to BN 110-2, client 120 with a media connection 210-3 to BN 110-3, and client 120 with a media connection 210-6 to media source 130, all via network 140. The media connections 210 (which include media connections; i.e., 210-1, 210-2 and 210-3, as well as additional media connections such as 210-7 from BN 110-1 to a media source 130 via network 140 or 210-4 to a locally-coupled media source 116 and others described below) each typically comprise one or more logical media channels transported between a source and destination on network 140. Each media channel of a media connection 210 may be a downstream channel (e.g. BN 110-1 as the source and client 120 as the destination) or an upstream channel (e.g. client 120 as the source and BN 110-1 as the destination) dependent on media definition (e.g. output image stream, input or output video stream, input or output audio streams and on the like). Media connections 210 may each be supported by one or more connection-oriented or best effort protocol (e.g. TCP/IP and/or UDP/IP respectively), optionally underpinned by real-time protocols (e.g. RTP), error management methods and/or encryption schemes known to the art (e.g. Advanced Encryption Standard (AES) encryption) for transporting various encoded media such as desktop display images, video content, audio content and/or peripheral device data such as keyboard traffic, mouse traffic and USB data.

The branch engine (BE) 220 embodiments of which are described in association with FIGS. 3 and 6 below, provides transport and composition functions for media connections 210-1 and 210-2 and media connection 210-4 to local media services 230 (e.g. media channels to local frame buffers, media player software, UC software, local media sources such as webcam, microphone and the like). Similar branch engines 222 and 224 operate in conjunction with TCCE 112-2 and 112-3 respectively. The client engine 250, embodiments of which are described in association with FIGS. 4 and 5 below, provides transport and composition functions for media connections 210-1, 210-3, media connection 210-5 from local media services 232 and/or a local operating system (e.g. media channel to webcam device driver), and media connection 210-6 from media source 130. Client engine 250 is coupled to peripheral controllers 260 (e.g. a display processor, audio controller(s), USB controller(s), and the like), which in turn couple to client peripherals such as display 126, audio devices and USB devices. In some embodiments, the client engine 250 is also a parent to other BNs on network 140 (not depicted in FIG. 2) and provides transport and composition functions for media connection(s) 210-6 to other such BNs not depicted. The maximum number of media sources, BNs and media connections is generally only limited by the capacity of network 140 and capabilities of client 120.

The TCCEs 112 each comprise a set of transport and composition rules (TCR) 290 (shown as TCR 290-1, 290-2, 290-3 and 290-4) each of which determines local transport and composition methods and priorities, collectively governing the operation of schema 200. The TCCEs 112 also each comprise a media transport and composition (MTC) configuration, or MTCC, 270 (shown as 270-1, 270-2, 270-3, and 270-4), each MTCC 270 comprising a set of MTC parameters 272 applied to rules 290. The TCRs 290 and associated MTCCs 270 may be initialized as default rules typically common to a set or sub-set of BNs 110 and client 120 depending on administrative and security group policies and then tuned by a user, administrator or automation infrastructure. Table 1 shows a set of transport and composition rules 290.

TABLE 1

TRANSPORT AND COMPOSITION RULES

Example Dialog Box Placement Rules

Dialog boxes from different sources should not be hidden under other windows
Place dialog box on unused area of the display
Place dialog box on out-of-focus areas of the display
Sliding scan between competing dialog boxes Example Window Focus Management Rules Reduce the focus of a window. E.g. When viewing a home security camera
from an office desk
Event-driven window focus. E.g. Place a VoIP call window in focus if the caller is identified in a specific whitelist of contacts

TABLE 1-continued

TRANSPORT AND COMPOSITION RULES

Favour processing resource allocation to one or more identified media streams
Share processing resource allocation between media streams
Favour processing resource allocation to history list comprising one or more most recent in-focus windows
Maintain focus on selected window(s)when pop-up window, menus or dialog boxes are active or overlaid

Example Codec Configuration and Bandwidth Management Rules

Delayed encoding of out of focus or reduced focus windows
Reduced quality encoding for out of focus or reduced focus windows
Skip encoding for out of focus or reduced focus windows
Apply quality index to window

Example MTC Restrictions

Restrict the number of media connections
Restrict the number of branch nodes
Restrict the number of sessions
Whitelist of preferred BNs for particular transport, processing or composition functions
Blacklist of BNs for particular transport, processing or composition functions
Authorized address list (or other security policies)

MTC parameters 272 may be configurable based on user preferences or TCRs 290 allowing the user to adjust the presentation quality and/or position of specified media sources based on preferences in combination with content, events and state information. In some embodiments, it is convenient to enable user reconfiguration at the time of an event, for example the user might be enabled to set preferences for specific MTC parameters (i.e., by setting specific values for select MTC parameters 272) that ensure a call from a particular caller is not muted, independent of the occlusion state of the desktop (or VoIP application window), in response to a VoIP ringtone or Session Initialization Protocol (SIP) message. As one example, pop-up notification messages related to a particular application are prioritized. For example, Microsoft OUTLOOK 'reminder' dialogs from a home computer session are given lower priority than similar dialogs from a concurrent OUTLOOK application associated with a session to an office computer. As another example, a window associated with a collaboration session (e.g. co-worker collaboration) is prioritized or deprioritized according to user preferences. Such user preferences or window priorities are communicated from the BN 110 client 120 and may be saved and retrieved for future sessions. Table 2 shows a set of user preferences used to determine TCRs 290.

TABLE 2

USER PREFERENCES

Composition Prediction Preferences

Update composition only in response to events and MTC parameter changes
Predict composition changes based on probabilities and allocates bandwidth to one or more composition outcomes weighted by probability

Media Stream Management Preferences

Traditional media stream management on a system wide basis
Rich single media stream management on a stream differentiated basis
Rich single media stream management on a server or BN differentiated basis
Quality levels and frame per second preferences (on a per media stream, per client or per network session basis
Balance between audio and video quality
Balance between audio and video network bandwidth allocation Transport and composition management functions as provided by the TCCEs 112 and the initiator TCCE122 differ from traditional desktop management functions (e.g. DWM) of a conventional operating system. In addition to conventional window presentation, composition decisions are based on the state of communication resources, latency, security, imperfect synchronization and distributed control. In a minimal embodiment, an MTCC 270 specifies size, position and z-order information for a set of overlapping windows associated with display 126. As with a typical MICROSOFT WINDOWS graphical user interface (GUI), windows may be visible, hidden or partially occluded by windows of a higher z-order. Generally, one or more of the BNs 110 and the client 120 each maintain control over one or more of the set of windows and request composition changes in response to local real-time events. In other embodiments described later herein, MTCCs 270 specify additional parameters such as image quality, audio parameters and composition predictions.

In the embodiment of schema 200, TCCEs 122, 112-1, 112-2 and 112-3 maintain MTCCs 270-1, 270-2, 270-3 and 270-4 respectively. The BN MTCCs 270-2 and 270-4 each typically comprise all or part of the MTC parameters 272 of MTCC 270-1, and MTCC 270-3 typically comprises all or part of the MTC parameters of MTCC 270-2 (i.e., the child typically comprises all or part of the MTC parameters of its parent). Updates to MTCCs 270 at different nodes are exchanged over MTC control channels 280, 282 and 284. In an embodiment, each MTC control channel 280, 282, and 284 comprises a virtual channel (such as a Remote Desktop Protocol virtual channel) between a node and an associated child node (e.g., between BN 110-1 and BN 110-2). It should be noted that while MTC parameters 272 are updated via control channels 280, 282 and 284 in response to MTC parameter changes and/or on a periodic basis, it is generally not viable to maintain precise data synchronization between the MTCCs 270 of schema 200 due to the different network latencies between nodes on network 140.

Figure 3:
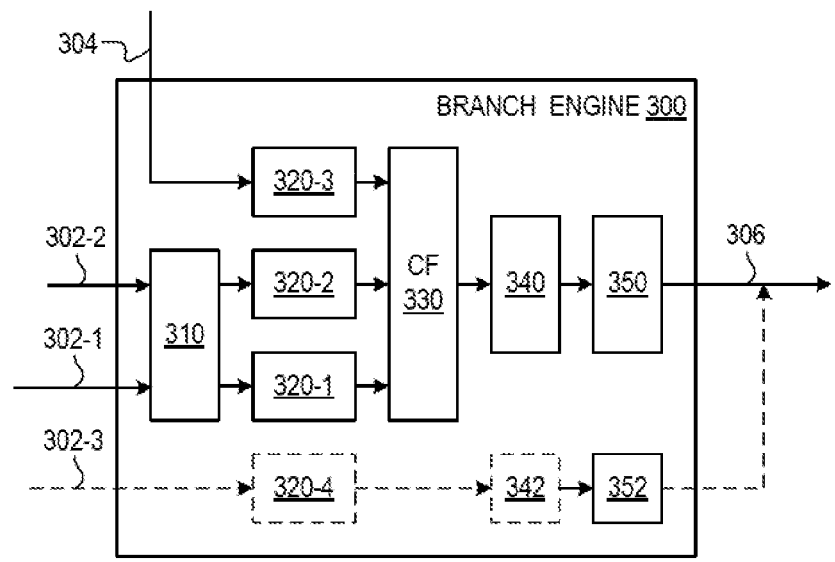
FIG. 3 illustrates an embodiment of a branch engine with respect to a downstream data path.

FIG. 3 illustrates select details of downstream path functions for BE 300 which is a representative embodiment of a BE 220. BE 300 comprises transport interface 310 which terminates media connections 302-1 and 302-2 from child BNs 110 and/or media sources such as media source 130; i.e. in a representative embodiment of BE 220-1, media connection 302-1 represents media connection 210-2, media connection 302-2 represents media connection 210-7 and media connection 304 represents media connection 210-4. BE 300 stores encoded and/or decoded media in transfer buffers (TB) 320-1 and 320-2, each of which typically comprises a memory structure partitioned into logical media channels according to content type (e.g. display image data channels, video data channels, audio data channels and USB data channels) and content transport priority. Generally, receiver-oriented transport interfaces such as transport interface 310 provide decryption functions, transport layer protocol functions (e.g. TCP, UDP, remote desktop protocol client software, local data caching facilities and the like) and/or media decoders (e.g. H.264 decoder, 2D drawing engine, Graphic Processing Unit (GPU), audio decoder, gesture interpreter and the like). In some embodiments, BE 300 provides composition functions for media connection 304 from media channels connected to sources within the same BN (e.g. frame buffers, audio data source, or locally coupled media source, such as media connection 210-4 depicted in FIG. 2) via TB 320-3. The CF 330 provides a composition of the data in TBs 320 to TB 340 which may also be logically partitioned into media channels. CF 330 provides image composition functions (e.g. alpha or z-order composting, opacity, image border management, transition functions such as window size transition (expand or shrink), window fade (in or out) and visual tree clipping functions) for pixel data in TBs 320, audio mixing functions for audio data in TBs 320 and redirect functions (i.e. 'null composition') for media channels intended for redirection from any designated TB 320 to a parent BN 110. Such composition functions are governed by MTCCs 270 and TCRs 290 of TCCEs 112 either local to the BN 110 or a delegated remote BN 110.

In some image transfer embodiments, a TB 320 is logically segmented into parent and child virtual transfer buffers which allows designated image data to be transported at elevated priority. In one such embodiment, a notification window associated with an occluded (and possibly otherwise unchanged) window which has an allocated TB 320, is detected via well-known image decomposition methods and assigned to a virtual transfer buffer within the allocated TB 320, thereby enabling priority transfer, z-order changes, alpha blending and aesthetic enhancements (e.g. fading effects) at the client 120 without a need for additional TBs 320 or O/S level window decomposition. The transport interface 350 provides transmitter-oriented transport layer protocol functions for media connection 306 to a parent BN or a client 120 (e.g. TCP, UDP, remote desktop protocol encoder functions and the like), media encoders (e.g. H.264 encoder, audio encoder and the like) and encryption functions. In some embodiments, media received on media connections 210 may be re-transmitted on media connection 306 with little or no change to the media itself while position data (i.e. window co-ordinates) associated with the media stream may get translated to CF 330. For example, encoded video content may pass through unaltered (i.e. no decoding and re-encoding of the media stream) whereas the coordinates of the video window are remapped. In some embodiments, BE 300 provides media pass through functions that bypass composition function. For example, in an embodiment media associated with media connection 302-3 is directed to TBs 320-4 and 342 which bypass CF 330. Media in TB 342 may use separate transport interface 352 or, in an alternative embodiment, use existing transport interface 350. In an alternative embodiment, media located in a particular TB 320 is transcoded to particular TB 340 or 342 based on the composition requirements defined by the MTCC.

Figure 4:
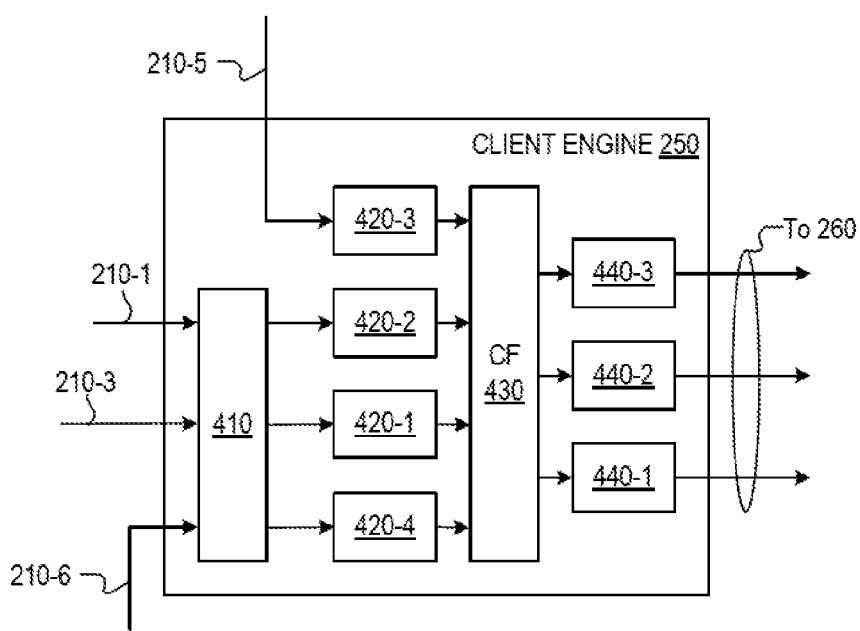
FIG. 4 illustrates an embodiment of a client engine with respect to a downstream data path.

FIG. 4 illustrates select details of downstream path functions for an embodiment of a client engine 250. Client engine 250 comprises CF 430 coupled to media connections 210-1 and 210-3 from child BNs 110 (via transport interface 410 and TBs 420-1 and 420-2), media connection 210-6 from a media source (e.g. media source 130) and media connection 210-5 from client media services (e.g., local media services 232 depicted in FIG. 2) or client operating system via TB 420-3. Examples of data composed via media connection 210-5 include client generated sprite, clock or logon overlay display screens. Transport interface 410 and TBs 420 (i.e., 420-1, 420-2, 420-3 and 420-4) provide similar functions of transport interface 310 and TBs 320 described. Composed media is transported to peripheral controllers 260, depicted in FIG. 2, via suitable egress TBs such as frame buffer 440-1 for display image data, audio buffer 440-2 for audio data and USB data buffer for 440-3 for USB data which in different embodiments, may be under management of device drivers of the client 120 or remotely managed by a BN.

Figure 5:
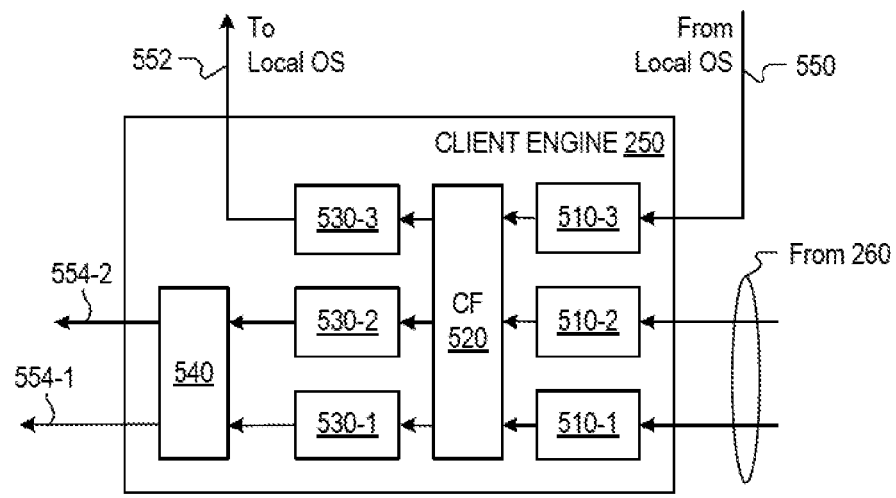
FIG. 5 illustrates an embodiment of a client engine with respect to an upstream data path.

FIG. 5 illustrates select details of upstream path functions for an embodiment of a client engine 250. Client engine 250 comprises CF 520 coupled to media channels from peripheral controllers 260 (comprising for example mouse, keyboard or gesturing device data, other USB device data and/or audio data) or media connection 550 from client media services, including channels associated with client media source 128, (depicted in FIG. 1), client frame buffers, client UC applications and the like via ingress TBs 510-1, 510-2 and 510-3. In an embodiment, CF 520 provides channel-dependent media redirection functions under control of the initiator TCCE 122 or a BN 110. For example, encoded video media in TB 510-3 might be switched to one (or more) of TBs 530-1 and/or 530-2 for transport to one or more particular child BNs (i.e. via transport interface 540 and one of media connections 554-1 or 554-2) and/or switched to TB 530-3 for consumption by media services local to client 120 via media connection 552. As another example, audio or Human Interface Device (HID) data from peripheral controllers 260 might be switched for termination at either client 120 or a designated BN 110 or both.

Figure 6:
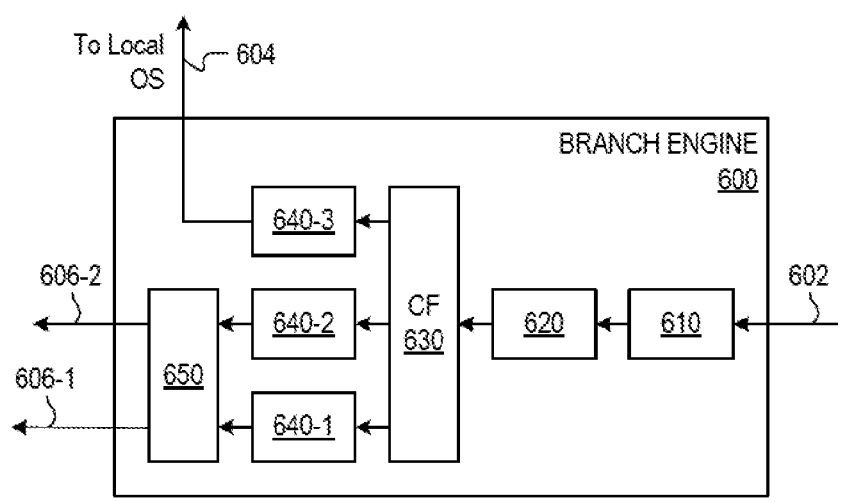
FIG. 6 illustrates an embodiment of a branch engine with respect to an upstream data path.

FIG. 6 illustrates select details of upstream path functions for BE 600 which is an embodiment of a BE 220. BE 600 provides CF 630 for media connection 602 from client 120 or a parent BN. Media connection 602 is terminated by transport interface 610 comprising receiver transport functions including in some embodiments, audio and/or video decoder or transcoder functions. Received media is stored in TB 620 in advance of processing by CF 630, CF 630 provides context- or media-dependent switching, broadcast, pass-through, redirection and gesture interpretation functions from where media data might be switched to one (or more) of TBs 640-1 and/or 640-2 for transport to one or more particular child BNs 110 (i.e. via transport interface 650 and one of media connections 606-1 or 606-2) and/or switched to TB 640-3 for consumption by media services local to BE 220 (via media connection 604). In an embodiment, CF 630 provides user interface command filters enabled to modify commands for the purpose of normalizing the user experience across branches of schema 200. By selecting common HID and media attributes (e.g. normalized cursor or gesture dynamics such as swipe momentum or double-tap speed, normalized sprites, normalized volume controls for audio and the like) user experience is enhanced by providing a consistent interface across windows.

Figure 7:
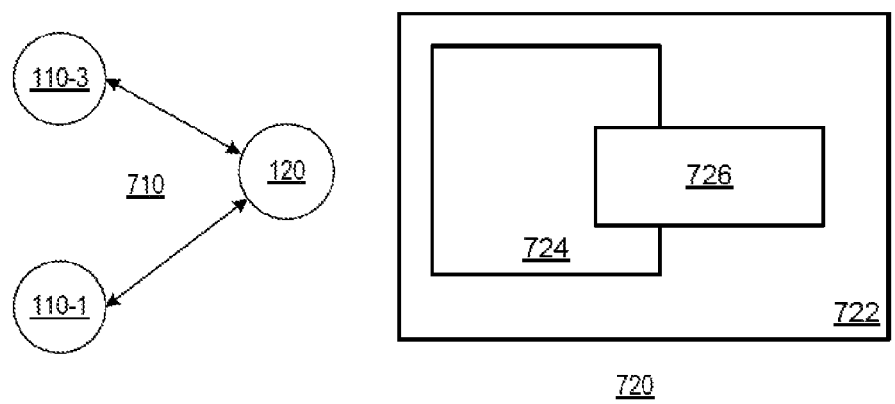
FIG. 7 illustrates a display composition comprising a client generated background window overlaid by a windows received from child branch nodes.

FIG. 7 illustrates an embodiment of a display composition 720 generated for schema 710 in which client 120 generates background window 722 which is overlaid by window 724 received from BN 110-1 and also overlaid by window 726 received from BN 110-3. Window 724 is of higher z-order than window 722 and window 726 is of higher z-order than window 724; i.e. in an embodiment, a first negotiated window 724 received at the client 120 from a server (i.e. BN 110-1) is composed with a second window 726 received from a second server (i.e. BN 110-3). Generally, image content is received by the client 120 from BN 110-1 and BN 110-3 in an asynchronous manner indicative of a typical packet network 140. Client 120 uses MTC 270-1 and initiator TCCE 122 for synchronization of the received image content (windows 724 and 726) with background window 722.

Figure 8:
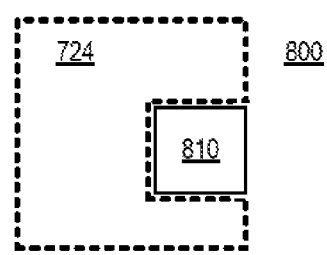
FIG. 8 illustrates a particular frame of a window received at a client.

FIG. 8 illustrates an embodiment of a particular frame 800 of window 724 received from BN 110-1 at client 120. In an embodiment, the initiator TCCE 122 conveys window sizes, co-ordinates of overlaid windows and z-order information associated with display composition 720 to BN-110-1 as a set of MTC parameters 272. TCCE 112-1 then uses the MTCC 270-2 to extract co-ordinates of the occluded portion 810 of frame 800 (i.e. portion 810 comprises non-transmitted image content of a source frame of BN 110-1 associated with window 724 as occluded by window 726). In another embodiment, the co-ordinates of the occluded portion 810 is calculated by the initiator TCCE 122 and conveyed back to BN 110-1 (and other BNs) as MTC parameters 272. The transmission priority of occluded portion 810 to client 120 may set according to composition rules. In various embodiments, the occluded portion 810 is transmitted in the background, transmitted at a lower priority, delayed or only transmitted in response to selective events at BN 110-1 such as detected user activity or change in status of a software application.

Figure 9:
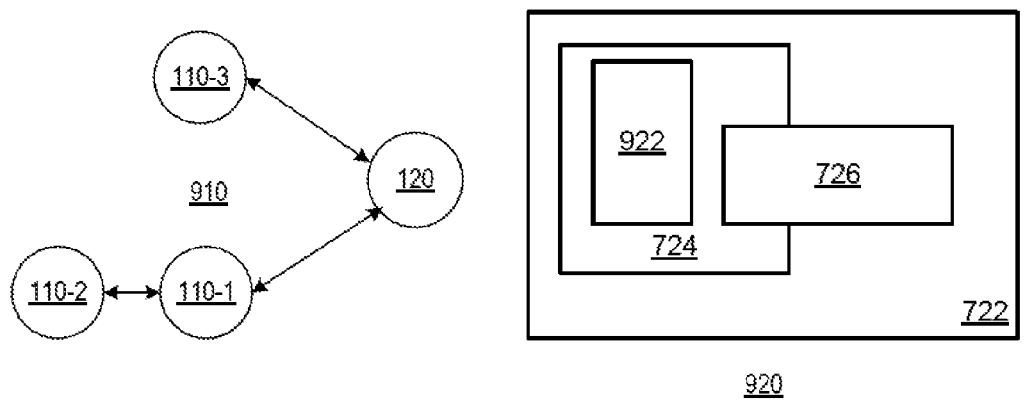
FIG. 9 illustrates a display composition comprising a client generated background window overlaid by a first window received from a first child branch node and a second window received from a second child branch node.

FIG. 9 illustrates an embodiment of a display composition 920 generated for schema 910. Client 120 generates background window 722 overlaid by windows 724 and 726 as for display composition 720. Content for window 922 (e.g. an image sequence associated with a published application or a video image) is received from BN 110-2 and overlaid on image 722. In one embodiment, window 922 is composed with the BN version of window 724 at BN 110-1 and the combined window communicated to client 120. In another embodiment such as a multi-media redirect (MMR) case, BN 110-1 manages the location of composition of window 922 within window 724 but the composition of window 922 with window 722 is executed at client 120 (i.e. MTC parameters 272 for window 922 are exchanged between BN 110-1 and BN 110-2 but content for window 922 is communicated directly from BN 110-2 to client 120 or communicated via BN 110-1 without processing at BN 110-1). In another embodiment, image content for window 922 passes through BN 110-1 to client 120 (e.g. via TBs 320-4 and 342) and the client 120 manages the location of composition of window 922, which may be defined by the boundaries of window 722 or limited to the boundaries defined by window 724 in different embodiments.

Figure 10:
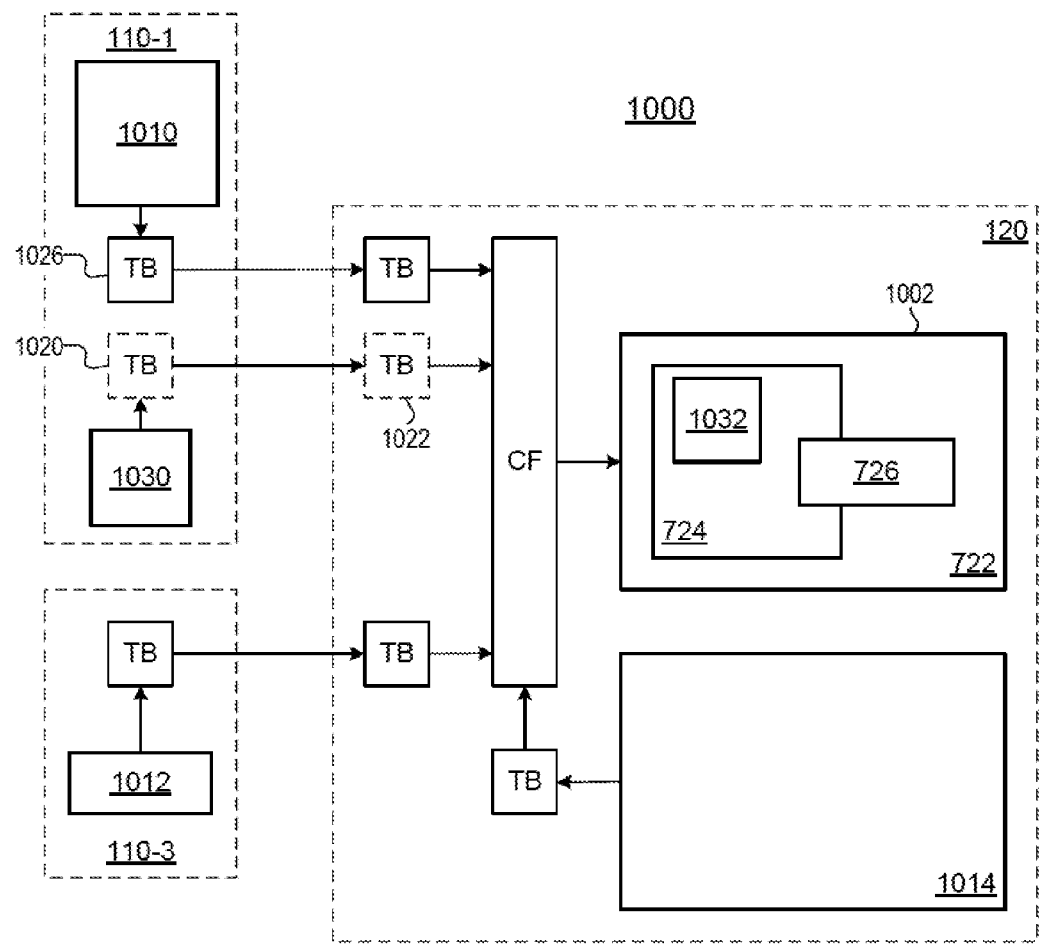
FIG. 10 illustrates a display composition comprising an overlay such as a dialog box or notification window.

FIG. 10 illustrates an embodiment of a display composition 1002 generated for schema 1000. Client 120 generates background window 722 (from source image 1014) overlaid by window 724 (from source image 1010 at BN 110-1) and window 726 (from source image 1012 at BN 110-3) as described for display composition 720. Source image 1030, generated at BM 110-1 represents a dialog box, notification window or other window that demands user attention. TCCE 112-1 configures TB 1020 and requests, via control channel 280, client 120 to instantiate corresponding TB 1022 to receive an encoded facsimile of image 1030. Client 120 decodes the image (i.e., from the received encoded facsimile) which is composed and displayed as window 1032. In an embodiment that achieves minimum latency in the display of such notification windows, the request from BN 110-1 to instantiate TB 1022 is communicated in conjunction with the encoded facsimile, for example in an asynchronous and simultaneous manner. In an embodiment, MTC parameters 272 from BN 110-1 to client 120 specify the placement location for window 1032 on window 724 or other location bounded by window 722. In embodiments where the z-order and location for window 1032 is in conflict with the z-order and location of a window associated with a different BN, client 120 may override window positioning rules from BN 110-1 and select placement of window 1032 based on client window positioning rules (e.g. a dedicated display area for such notifications), policy settings or learned user behaviour.

In an alternative embodiment, image 1030 is extracted from image 1010 using decomposition techniques and TB 1020 is instantiated as a virtual TB of TB 1026.

Figure 11:
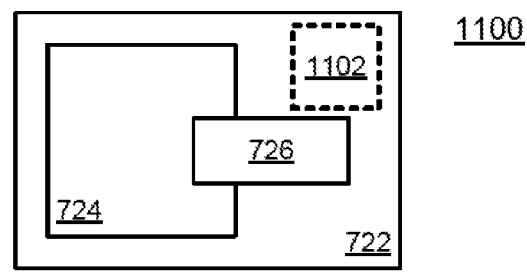
FIG. 11 illustrates a display composition comprising a received window, the location of which is determined by the client.

FIG. 11 illustrates an embodiment of an alternative display composition 1100 generated for schema 1000 in which the received facsimile of window 1030 is displayed as window 1102, the location of which is determined by client 120. In an embodiment, the client 120 determines the location for window 1102 according to the arrangement of other windows of display composition 1100. In another embodiment, a dedicated area of the display is allocated for notification windows. In some touchscreen client embodiments such as a tablet display, window 1102 is composed to an off-screen display area accessible via menu and/or gesture interaction.

Figure 12:
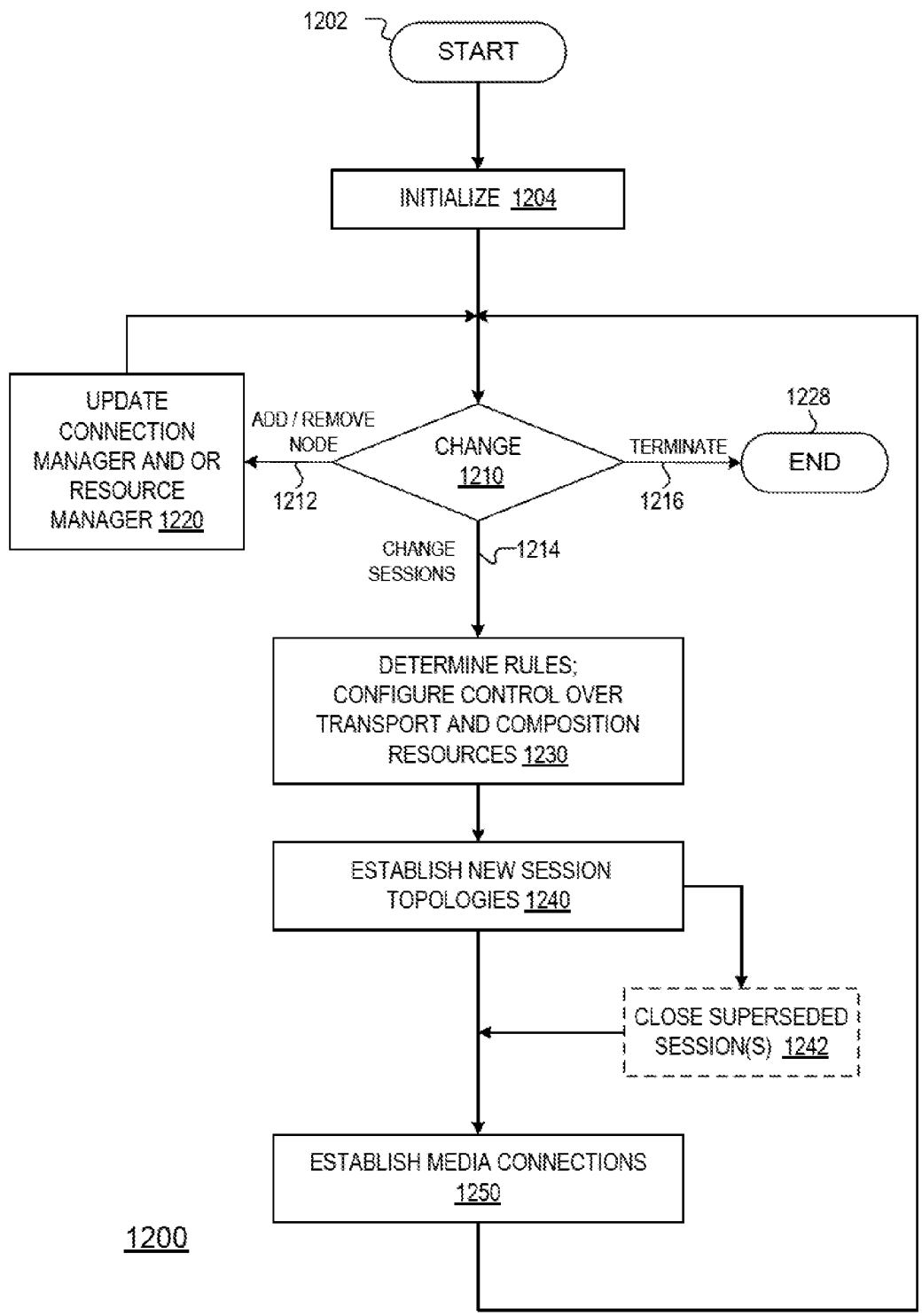
FIG. 12 depicts a process for configuring and maintaining a system which enables flexible use of composition resources.

FIG. 12 depicts a process 1200, in accordance with one or more embodiments of the present invention, for configuring and maintaining a system 100 which enables flexible use of composition resources via distributed knowledge of MTC parameters 272 and negotiated resource sharing. Process 1200 starts at 1202 and proceeds to step 1204 ("Initialize") during which BNs 110 register with connection manager 150, for example by submitting media transport and composition capabilities (e.g. codec resources, encryption and/or security features, TB specifications, GPU resources, location information, performance and on the like) or by requiring an administrator to furnish such registration details. Such registration information may be maintained by the connection manager 150 and/or selectively distributed to BN groups according to administrative policies, enabling inactive BNs 110 to be powered down when not utilized. In an embodiment, connection manager 150 is identified by the client 120, for example as a step in the client initialization process in which the client seeks and identifies BN resources suited for a particular composition function, While connection manager 150 may be invoked to identify BN resources during registration prior to media connection establishment, the connection manager 150 may not be required to actively manage BN and composition functions following session establishment between BN and client 120. Rather such functions are generally managed by the client 120 or the BN 110. Client 120 is enumerated by detecting and initializing local peripherals including display 126, HID devices, audio devices, media sources and other peripherals such as USB devices. In an embodiment, the initiator TCCE 122 is configured to present a login display window on display 126. Typically, HID devices are terminated by device driver software at client 120 until one or more sessions with BNs 110 are established.

Process 1200 proceeds to step 1210 ("Change") as a precursor to establishing any sessions or to register new resources or to change sessions, for example by renegotiating resource utilization. At step 1220 BNs are registered or removed and the connection manager 150 may be updated if nodes are detected as added or removed at branch 1212. Resource manager 160 may be updated to reflect a change in resource loading. In some embodiments, registration information is also updated responsive to a change in capabilities of a previously registered BN or client node. In some embodiments, added BNs register their capabilities directly with parents or peer branches (e.g. BNs assigned to a common policy group) rather than a connection manager. In some embodiments, BNs submit updated performance statistics (e.g. frame rate, image quality, CPU load information and on the like) with resource management functions of related nodes either periodically or responsive to such a statistics change.

From step 1210, the process 1200 proceeds to step 1230 via branch 1214 to change sessions, where the change relates to an event such as a request for a new media connection, a change in composition location for a current session, a change in control over TBs, a requirement to adjust resource utilization (e.g. network bandwidth, display resources or codec burden) or requirement to optimize the interface grade such that the multiple media sources associated with a client 120 are generated, transported and composed for best user experience. In an embodiment, the resource load (e.g. memory or CPU utilization) on a particular BN is high (or the connection to the particular BN poor) and a session change 1214 corresponds with running a software application on a different BN. For example, during software application launch procedure, available resources are evaluated (e.g. by querying resource manager 160) and a different BN is selected based on user preferences (e.g. a prompt) or administrative policies. As another example software applications are migrated during operation.

Process 1200 proceeds to step 1230 ("Determine Rules; Configure Control over Transport and Composition Resources"). TCRs 290 related to transport and composition resources (e.g. codec parameters, composition preferences and composition engine definitions such as capabilities of scalers, blenders and the like) are parsed and applied. Display surfaces are configured. For example display resolution and viewport dimensions are inherited from a parent node or loaded from a set of administrative policies. Such a viewport comprises the display area presented by a parent node to its child node. If a client or BN is determined to have a resource constraint (e.g. insufficient memory or allocated display area, under-rated CPU or GPU processing capability or ingress bandwidth limitation), the constrained node may negotiate the use of upstream child node resources or select a schema preference based on administrative policies or historic use patterns. Resource constraints are dynamic in nature so renegotiation of resources may be initiated by a user or responsive to a sensed change in image quality, frame rate, network bandwidth, interactive latency or application behaviour. If a network constraint is detected between a client and a branch or child and parent BNs, highly compressed media streams (e.g. an H.264 image sequence) may be directed to a node downstream of the constraint for decoding. In an exemplary embodiment, MMR or published application are enabled when a BN 110 is provided control over TBs and window placement of an image sequence associated with a different source (e.g. media source or different BN). In an exemplary application publishing case, a child of a present BN is engaged to present a media stream either to the present BN or directly to the client 120. In an embodiment, the user or an administrator is granted permission to select or adjust such transport and composition.

If, at step 1210, the change signals a termination, e.g. a client shutdown event, process 1200 proceeds along branch 1216 and ends at step 1228.

Following step 1230, process 1200 proceeds to step 1240 ("Establish New Session Topologies") in which a session topology between BN and client is negotiated. In embodiments where intermediate TCCE nodes operate on media, a session topology may be segmented to include such intermediate nodes. The negotiated session topology comprises media specifications (e.g. display orientation and resolution for each display surface associated with the topology, codec parameters for imaging, audio and peripheral data), associated mappings between source and destination TB, definition of composition functions related to TCCE nodes and transport parameters (e.g. security requirements such as encryption standards). Generally, session topology attributes are negotiated between TCCE elements based on user preferences and policies in view of advertised display and device attributes presented by the client or by a parent node. In an embodiment, client 120 requests a display buffer from the operating system and a portion of the display buffer is presented out to the BN 110 during session topology establishment. In some cases, a BN may operate as a client node to an upstream BN (in addition to BN function for a downstream client). In such a case, step 1240 prompts a change 1210, following which the client node functionality is activated.

Sessions deemed obsolete or redundant are terminated at step 1242 ("Close Superseded Sessions"), optionally followed by the establishment of new media connections at step 1250 ("Establish Media Connections") to ensure a continuous media stream at the destination node. Provided a media connection is managed independent of underlying TB resources, the established TB with established transport parameters may be preserved until the new media connection has been formed. Then the old media content in the TB is merely replaced with the new media content associated with the new media connection, thereby allowing continued use of the old media content during the transition of the underlying transport until the new media content is available. Once the new media connection(s) have been established, process 1200 returns to step 1210 to service another change event.

Figure 13:
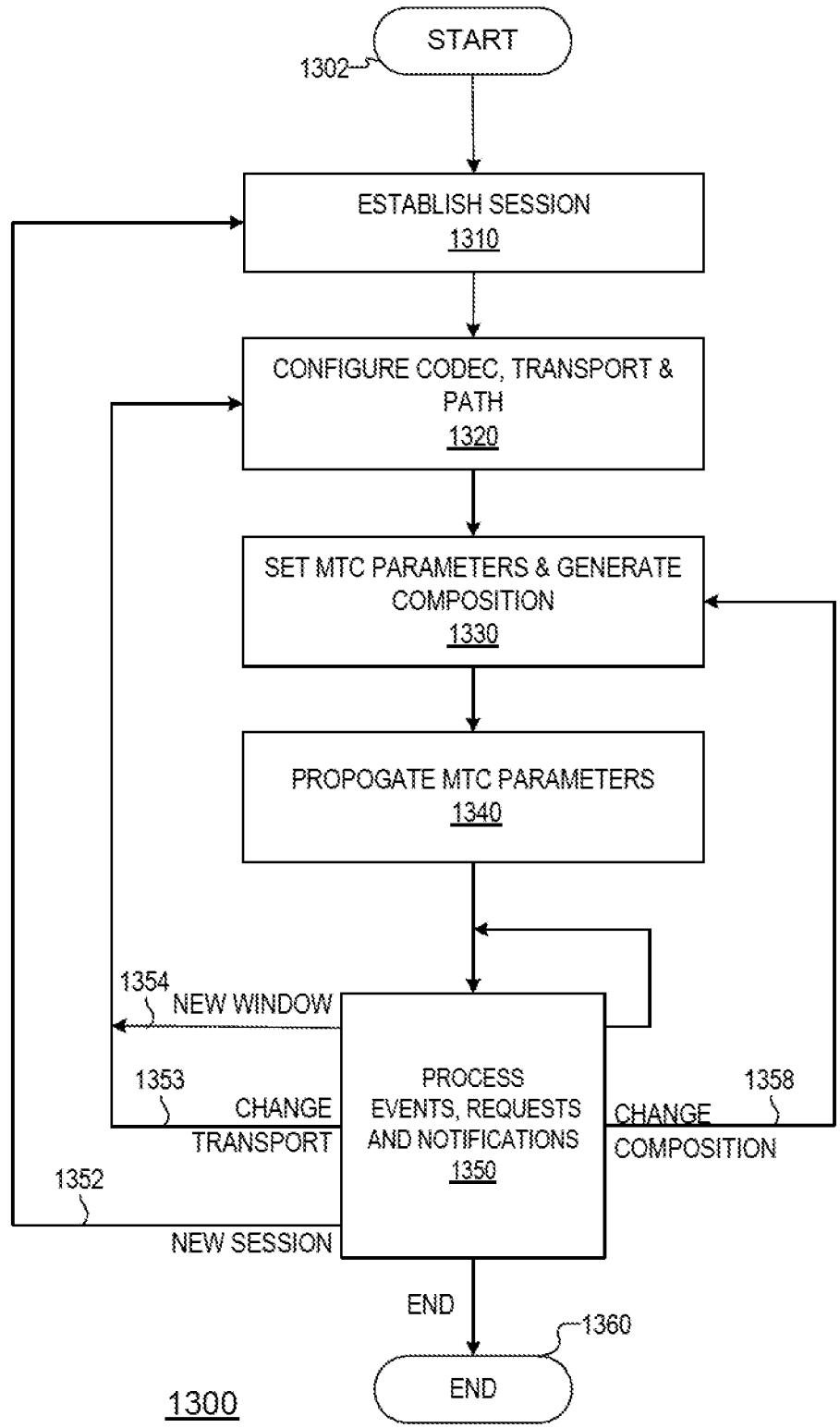
FIG. 13 illustrates a media transport and composition management process as might be executed by a branch node.

FIG. 13 illustrates a media transport and composition management process 1300 executed by a BN 110 in accordance with one or more embodiments of the present invention. Process 1300 starts at step 1302 and proceeds to step 1310 ("Establish Session") in which the BN is initialized, the local physical topology is determined, communications with the parent node are established and a session topology, for example as described for step 1240 (of the process 1200) is negotiated. Session topology preferences may be determined based on those read from a topology store (ref. U.S. patent application Ser. No. 13/653,073, incorporated herein by reference in its entirety) in light of presented device capabilities, memory configuration and CPU processing capabilities of the client 120 and the BN. In an embodiment, an MTCC is generated and updated based on user preferences, the attributes of client 120 (e.g. tablet, phone or zero client), location dynamics and network (e.g. to support on-premises mobility). MTC parameters 272 for different BNs are adjusted according to such dynamic attributes, including terminating sessions if warranted (e.g. due to display limitations, user preferences, usage history, security, connection capabilities, and the like).

Process 1300 proceeds to step 1320 ("Configure Codec, Transport and Path") in which various BE and client engine resources such as TBs, codecs and encryption functions described for BE 220 and client engine 250 are configured. New TBs associated with windows and media streams are generally instantiated within the existing session context established at step 1310 but a distinct session may be established if required, for example to utilize an alternative network path. In some embodiments, additional resources such as GPU, media encoders, media decoders (e.g. H.264 video decoder) and offload engines (e.g. protocol accelerator) are configured to support media transport.

At step 1330 ("Set MTC Parameters & Generate Composition"), the MTC configuration for the BN is set or adjusted based on MTC parameters 272 received from a downstream (i.e. parent) node such as client 120 (or in the case of BN 110-2, from downstream server BN 110-1). On initialization, a default MTCC may be loaded in compliance with the negotiated session topology or MTC parameters 272 inherited from the parent node or a different BN with delegated control over the local BE. Generating the branch window composition comprises combining media from source TBs as described for CF 330. In one embodiment comprising an image frame composition, content from various TBs are composed such that regions occluded by windows of higher z-order are masked out. Such masked regions are encoded using TCR 290 governed by MTC parameters 272 (e.g. delayed encoding, reduced quality encoding or skip encoding) to preserve system resources. Typically different BNs 110 and the client 120 are governed by common composition rules, a common interpretation of display priority and a common interpretation of window layering (i.e. z-order) such that two nodes with similar windows and MTC parameters 272 generate a similar branch window composition. As an example, commonly interpreted window display rules ensure display priority requests (e.g. assignment of a notification window to a high z-order layer) are interpreted at the correct priority by the client. BNs and client 120 may execute additional contention resolution rules based on policies that prioritize windows or media streams of specified origin or recurrence pattern. In other embodiments, display sharing rules are invoked to reposition contending windows according to a layout template. In some embodiments, an upstream server (e.g. BN 110-2 upstream of BN 110-1) inherits contention resolution rules from the parent node during session establishment.

At step 1340 ("Propagate MTC Parameters"), the BN updates children with window layout parameters of the latest desktop composition, including updated window position information, z-order and alpha blending parameters. In an embodiment, MTC parameters 272 relating to the entire schema 200 (i.e. the total desktop composition) are propagated to the child BN. In an alternative embodiment, the child BN is presented a sub-set of MTC parameters 272 limited in scope by the session topology negotiated with the child BN (i.e. limited to the branch window composition). In some embodiments, MTC parameters 272 include a prediction of future window positions based on window motion and estimated latency between the node and the child node. Such predictions may be provided as motion vectors or a set of predicted window co-ordinates. In an embodiment, a particular BN 110 communicates MTC parameters (or MTCC) associated with the parent of the particular BN to the children of the particular BN. This enables the particular BN to itself provide 'pass-through' and/or transcode only' functions of media content from the child of particular BN to the parent.

At step 1350 ("Process Events, Requests and Notifications"), process 1300 responds to requests generated by local operation systems or applications (including functions executed locally), or requests received from parent or child BNs or the client. If action is required, process 1300 performs one of i) return to step 1310 (i.e., as shown by branch 1352) in event of a new session requirement, ii) return to step 1320 (i.e., as shown by branches 1353 and 1354) in event of a transport change or new window requirement, iii) return to step 1330 (i.e., as shown by branch 1358) in event of a composition change requirement, or iv) proceed to step 1360 ("End") if process 1300 is terminated. User input events (such as HID, audio, imaging, gesturing, multi-touch or gaze tracking events), application events (such as timer events, execution completion or suspension events, application state changes, presentation changes, error conditions, software download completion, or content filter events such as a specified stock quotation update), remote events (such as a change in remote resources, e-mail notifications, software update requests and the like), status events (such as operating system status notifications, warnings or resource changes, a server losing a media connection from a child server, server migration events) and signaling or session/content change events (e.g. window maximize) may all be processed or interpreted with a view to optimize the interface grade of schema 200.

Step 1350 exits at branch 1353 when a transport change is required. As one example, when a session mandates a companion MMR connection between a media source 130 and client 120, BN 110 may be required to initiate the companion MMR connection by passing address information for the media source to the client 120 in order for the client 120 to establish the MMR connection with the media source. As another example, when the probability increases that a particular media stream will not be consumed (e.g. due to a focus change event, a notification pop-up or application software status change), the bandwidth allocation and quality is reduced.

Transport and/or codec changes might be initiated to adjust codec parameters, reassign the cache or update image decomposition rules in response to events related to changed composition, changed window focus, transport dynamics (e.g. changes to network availability or bandwidth) or triggers from user interface behaviour filters or change application type. In an embodiment, user input response times to application prompts are used as predictors of image content priority which in turn are used to adjust codec parameters. Slow responses indicate that an image stream associated with the user input event has reduced priority while absence of a response within a specified acknowledgement period indicates lowest priority. In another embodiment, codecs are tuned to improve user interactivity when a latency threshold is exceeded. This may be accomplished by anticipating user behavior or user interaction patterns or by selecting an increased frame rate of an image sequence in favour of image quality during periods of high user interaction. In another embodiment, the horizontal quality of a window under rapid horizontal motion is reduced in order to reduce bandwidth and present the image in the window under motion by horizontally blurring the image.

If a new window is generated by the operating system, for example a new application window, pop-up window or notification window, step 1350 comprises preparing MTC parameters 272 for the new window that specifies the location, size and z-order for the window, including identity of a new TB associated with the new window content. In an embodiment where a notification window is generated, step 1350 exits at 1354 so that new TBs can be instantiated to support the transfer of the content to the downstream parent node together with the MTC parameters 272. In some embodiments, the new TB may be a virtual TB (i.e. logical partitioning) within an existing window definition. By transmitting MTC parameters 272 simultaneously with the encoded window content, the latency associated with first waiting for a positive acknowledgement by the parent to a composition request before transmitting the overlay is avoided.

If a codec adjustment or other transport change is required, step 1350 exits at 1352. For example, encoder frame rate and image quality might be adjusted in relation to the size of a visible window, or in response to a change in window focus, network availability or processing resources. As another example, image cache context might be adjusted as display windows and corresponding TBs are added or removed. Caching based on window context (by assigning different caches to different TBs) enables hidden or occluded windows to be sustained in cache independent of display activity of other windows, including overlays. As another example, a cache security policy allows disabling the cache associated with a particular TB or migrating the client cache resources from the client node to a different composition point (such as a secure child BN in proximity to the client) when the location of the client node is detected as outside a specified geographic region. In an embodiment in which MTC parameters 272 comprise a quality index or quality control value associated with each window in a desktop composition, the quality index of a particular window is adjusted in relation to the level of occlusion, z-order or window focus. By assigning quality index values on a per-window basis, the encoder can determine the quantization level for an active window without overloading the network, thereby balancing quality settings between active and non-active windows in order to optimize user experience. For a complete discussion on quality indexing using a control value, refer to U.S. patent application Ser. No. 12/838,056 incorporated by reference herein in its entirety. If the session comprises audio connections, MTC parameters 272 may comprise audio mixing parameters, for example mute or volume adjustment parameters defined at least in part by z-order or focus of a corresponding application window.

Step 1350 returns to step 1330 by branch 1358 if a new BN composition is required, for example when the window layout changes due to a move, resize or a change in z-order. In an embodiment in which the BN is enabled to predict window layout (for example following a specified delay after the previous composition was generated or in cases where intermittent reception of occlusion coordinates are detected), branch 1358 is engaged to generate an intermediate composition based on a predicted branch window composition. In an embodiment, one or more future user input events (e.g. a mouse movement or window resize event) are predicted at the BN based on anticipated future user input events. The BN responds by generating one or more predicted future image frames which are transmitted to the client 120 or downstream BN. The client 120 or downstream BN selects correctly predicted image content for display based on actual user input events corresponding with the predicted image content. As one example, the actual user input event may be modified or translated at the BN to provide consistency between different BNs or consistency between user interaction with a BN and user interaction with an operating system or media services 232 local to the client 120. In one embodiment having a touch interface, a complete user interaction may be associated with a sequence of touch events. The BN 110 anticipates a particular touch event sequence by generating and transmitting a predicted image sequence based on the first of the predicted sequence of touch events; e.g. when a touch event is detected and predicted to be associated with an application launch event, the application is launched and an image associated with the launched application is transmitted (or a cache reference may be generated in embodiments where the image is cached from a previous launch). If the touch event is validated, for example as a double-touch or release event, the client displays the image immediately and at improved responsiveness over the alternative approach of first completing the gesture before launching the application. If prediction is incorrect, for example if the touch event is subsequently interpreted as a swipe event, the application is closed again and the image is discarded by the client. Other examples of anticipation of user interactions include i) transmitting hidden, occluded or off-screen content when the associated window edge is selected before it is determined if the window will be increased or decreased in size, ii) transmitting hidden new content for an obfuscated area when a mouse pointer is recognized to be hovering over a "window close" or "window minimize" icon, iii) transmitting full screen content when a mouse pointer is recognized to be hovering over a "select full screen" icon, or iv) transmitting full window content for a hidden window based on a notification dialog box being sent. The probability of such anticipation of user events may be extracted from a record of similar historic events and responses. Furthermore, the weight applied to such predictions may be increased in association with increased response latency where anticipation measures bring higher value to user experience.

In an embodiment, content is transmitted based on a high probability of a future composition change and then held on standby by the client until (or if) the content is needed. Scrolling, panning, application switching (e.g. via swipe actions) and drop down menus activation may all be predicted from HID information such as mouse position and gesture event stream.

Figure 14:
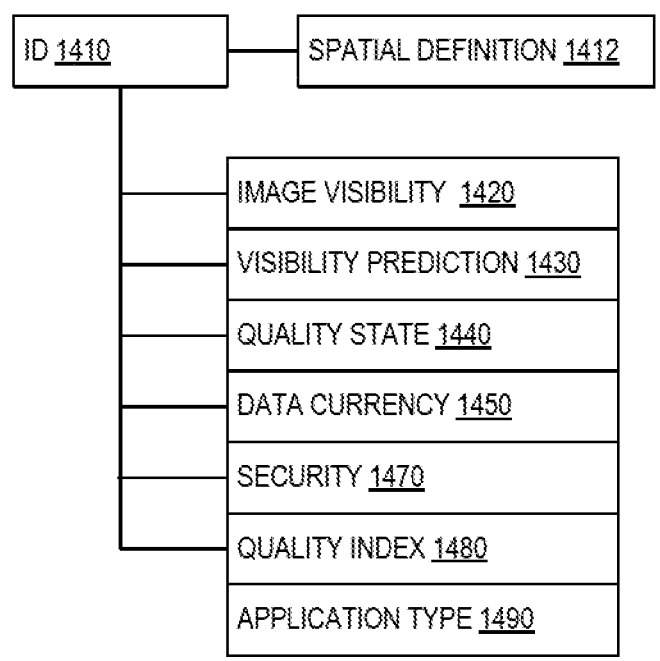
FIG. 14 illustrates a set of MTC parameters for an image section such as a window.

FIG. 14 illustrates a set of MTC parameters 1400 for an image section such as a window or portion thereof as maintained by TCCE 112 in accordance with one or more embodiments of the present invention i.e. in an embodiment, MTC parameters 1400 represent for an image portion represent a portion of MTC parameters 272. The set of MTC parameters 1400 is identified by a unique identity number 1410 which may be associated with a particular TB, and a spatial definition 1412 which may be explicit (e.g. rectangular region or frame coordinates or spatial mask) or implicit (e.g. raster ordered blocks). In embodiments where select MTC parameters are specified at a block level and other MTC parameters are global to a window, the hierarchy of MTC parameters 1400 is modified accordingly. While some MTC parameters such as image visibility 1420 and visibility predictions 1430 are reflected around schema 200, others such as quality state 1440 and security 1470 are generally maintained locally at a BN or at each of a BN and select child branches of the BN.

Image visibility parameters 1420 comprise information such as z-order, alpha blending (e.g. '% blending'), occlusion level (e.g. visible, partially occluded, fully occluded) and focus information (e.g. 'in focus', 'out of focus') as might be derived from hints received from the parent, or derived from cursor location, gaze detection feedback and the like. In an embodiment, such as a published application environment in which only a 'viewport' portion of the source frame buffer is visible at the client node, image visibility may also comprise viewport details for a region. Regions outside the present viewport with a high probability of imminent display (such as pixel rows immediately above and below the viewport that are subject to being scrolled into view) may be cached downstream in anticipation.

Visibility prediction parameters 1430 comprise timing predictors (e.g. active frame counters or timers) indicating when the image section should be refreshed at the parent. Such predictors are used to skip or deprioritize intermediate frame updates during transition periods for regions where timing for a future resting frame state can be accurately estimated (e.g. window maximize, window minimize, window swipe). In an embodiment, the frame update rate for a region is reduced from 30 frames per second (fps) to 5 fps during such a windows transition. In another embodiment, a maximum image quality level is also specified in association with transition events that are associated with human interactivity in order to preserve responsiveness. For example, during swipe, pinch or zoom transitions, the region may be updated at a frequency conducive to human interactivity (e.g. 20 fps) but image quality may be reduced to preserve network or processing bandwidth.

Quality state parameters 1440 maintain image quality information such as i) quality level for a source image, ii) time expired for the source image at the current quality level, iii) quality level for an associated update image as transmitted to the parent, and iv) time expired for the update image at the current quality level. While the source image quality is typically '100%' for image content derived at a BN (e.g. a desktop image composed in a frame buffer), in applications such as medical imaging or streaming media applications, the source image may arrive at the BN 110 at a reduced quality (e.g. 50%) and be improved over time according to bandwidth availability and/or image motion characteristics. Similarly, the BN may send initial image updates to the parent at a reduced quality and provide updates based on image visibility parameters 1420 and visibility predictions 1430 in addition to bandwidth availability and motion characteristics.

Data currency parameters 1450 maintain state information indicating if the region is current (i.e. a state in which the image most recently transmitted to the parent is either an identical facsimile or a reduced quality facsimile of the most recent image maintained at the BN 110) or if the region is no longer current (i.e. a state in which the image at the BN 110 has changed but has not yet been transmitted downstream to the parent node). Data currency parameters 1450 may be used to constrain the visibility of image representations at the client 120, for example as illustrated by the visibility states 2000.

Security parameters 1460 define security policies, generally on a per-window basis. In an embodiment the flow of downstream content is controlled by a particular BN according to confirmation of client location. As an example, a published application or part of a display region is only available to a client when the client location complies with whitelist location criteria, thereby restricting access to specified applications when a client is located off premises. As another example, a BE is enabled to isolate insecure applications or untrusted BNs from other nodes by restricting access to resources. An untrusted browser executing on a BN may be enabled to open undesired windows, load applications, access local applications, run scripts, and perform similar functions on a particular node but the browser is unable to contaminate the client 120, or other BNs. Isolation may be achieved by limiting the capabilities of TBs and/or restricting capability for the BE to negotiate additional resources; e.g. a BE may be prevented from i) making USB or webcam connections or ii) restricted to output only media content (i.e. typically audio and imaging content) except for selective HID input. Such security policies may be applied in embodiments when a session can only be negotiated to a limited security level (e.g. an absence of authentication).

Quality index 1480 specifies the quality index for a window or portion thereof, thereby enabling the encoder to set an encoding quantization level or frame rate for optimum network utilization without specific knowledge of the activity levels of other windows in schema 200. Active and inactive windows use the quality index 1480 to adjust their quality settings for the best user experience without overloading the network.

Application type 1490 defines application type (e.g. media player window such as a Windows Media Player or QuickTime window, a video conference image window, a CAD image window) and optionally mode of interaction (e.g. a touch interface or pointer-based application interface) used to configure UI command filters. In some embodiments, application type 1490 may be assigned to a particular application (e.g. MICROSOFT WORD, MICROSOFT EXCEL or ADOBE PHOTOSHOP), a particular software-as-a-service (SaS) application (e.g. SALESFORCE) or a group of related applications (e.g. MICROSOFT OFFICE) as identified by the server registry, plug-in software, administrative policies or the like. TCR rules applied on the basis of application type 1490 enable application-based quality of service (QoS), application-based security (e.g. application accessibility when used in conjunction with location information or a real time calendar to, for example, block an application from being accessed outside an enterprise LAN or during specified calendar blackouts), application-based bandwidth utilization restrictions or bandwidth targets, application-based encoding quality (e.g. encoder selection, encoding quality parameters, delivered frame rate, or transfer buffer size), or application-based resource utilization (e.g. composition effects such as fading effects or application-based HID interface enabling selective gesture interpretation when used in conjunction with a client 120 with a touch interface). In an embodiment, the transfer buffer size is adjusted on a per-application basis based on available network bandwidth allocated to each application to achieve constant (and minimum) queue delays for each application. In another embodiment, transfer buffer size is increased for media applications such as video or MMR content to prevent underflow on variable bandwidth networks. In an embodiment, the bandwidth target for a particular application is adjusted according to network definition (e.g. reduced bandwidth target when part of network 140 comprises a cellular network or increased bandwidth target when network 140 bypasses a cellular network).

Figure 15:
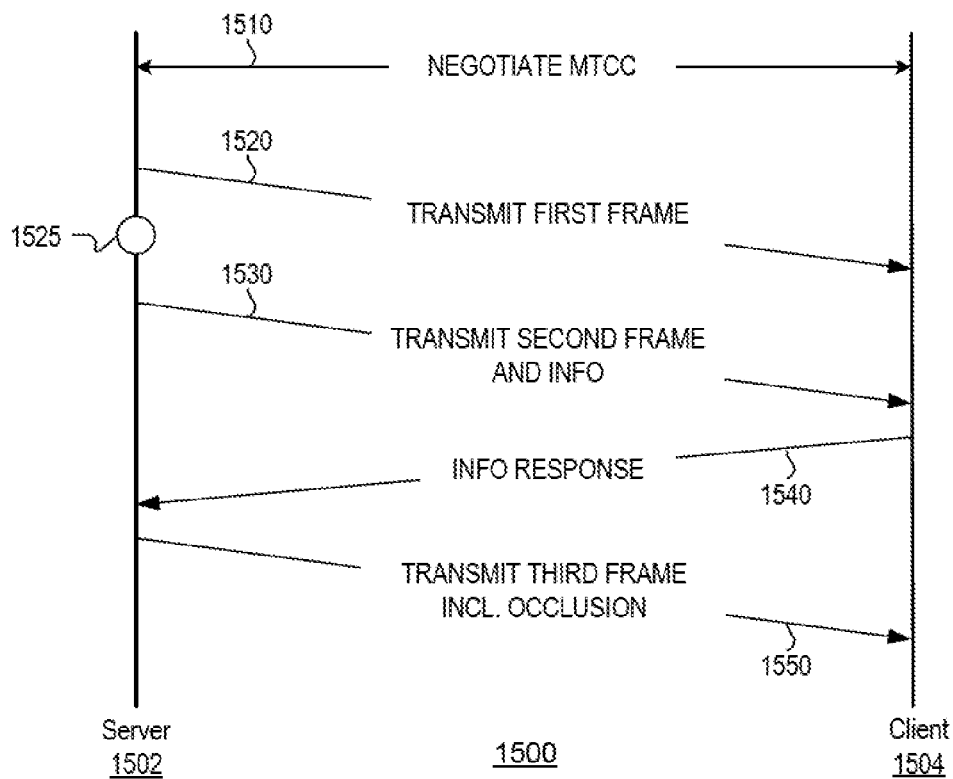
FIG. 15 illustrates a communications sequence associated with communicating an image stream from a server to a client.

FIG. 15 is an illustration of a communications sequence 1500 associated with communicating an image stream from a server 1502 (i.e. server 1502 is an embodiment of BN 110) to a client 1504 (i.e. client 1504 is an embodiment of client 120) in accordance with one or more embodiments of the present invention. At step 1510, server 1502 negotiates an MTCC with client 1504 using a network session established at step 1310 over network 140. The MTCC defines (i) a window (e.g. window 724) as a portion of a display of the client 1504 and (ii) an occluded portion of the window (e.g. occluded portion 810) defined by the client. In an embodiment, the client 1504 allocates the window, exclusive of the occluded portion to the server. One method for the client to allocate a window exclusive of an occluded portion comprises the client providing the server with an image mask indicating regions of the window that are covered in the client display composition. In an embodiment, the portion of the display comprising the window is a sub-portion of the overall display dimension. For example, the display might comprise a display composition with multiple sub-portions, each comprising a window. The various windows may be associated with one or more servers and/or the client 1504 itself. The occluded portion may comprise additional occlusion of an audio stream associated with the window which may negotiate an audio mute, volume adjustment or quality adjustment related to the size of occlusion or other audio mixing rules related to the occlusion. In an embodiment the MTCC negotiated at step 1510 comprises the client computer referencing a prior MTCC resulting from a user interaction.

The server 1502 generates a sequence of image frames, each comprising pixel data for visible and occluded portions of each image frame compliant with the MTCC negotiated at step 1510. Generally, an image compliant with the MTCC first includes those image areas defined by the client-specified occlusion and the step of occluding such image areas is performed at the time of image encoding. For example a series of frames from a software application are rendered to the image size defined by the dimensions of the window. In an embodiment, the client 1504 references historic MTCC data (e.g. data associated with a prior network session and associated display composition) to determine the negotiated MTTC parameters. Historic MTCC data may be accumulated by capturing changes in MTCC parameters based on user interaction (e.g. window dimension, z-order changes or audio adjustments). Such an approach enables windows to be sized and ordered to match previous configurations or other media streams such as audio to be initialized to preferred configurations. Step 1510 may comprise the server 1504 adjusting first MTC parameters of the server based on second MTC parameters associated with a second server (e.g. BN 110-3), received from the client computer and communicating the adjusted MTC parameters to an upstream server (e.g. BN 110-2).

The server 1502 generates encoded frames in compliance with an MTCC 270 negotiated at step 1510, each encoded frame typically comprising encoded pixel data for regions of the image that have changed subsequent to a previous transmission. Image areas identified as occluded are not necessarily encoded for immediate transmission although may be encoded for subsequent transmission and/or the encoded frame may indicate occluded regions but omit the corresponding encoded pixel data. The encoding of the pixel data uses MTC parameters and TCR rules to ascertain quality requirements, visibility predictions, application type, and so on. At step 1520, the server 1502 transmits an encoded first frame which is absent of the occluded portion. This may be accompanied by audio frames compliant with MTC parameters. The encoded first frame may be transmitted directly to the client or via a client proxy or other appliance associated with the client.

Event 1525 is an 'upstream event' excluded from the negotiated MTCC (i.e. server-side and generally unrelated to client 1504) identified by server 1502 following negotiation of the MTCC at step 1510 that impacts the desktop composition and mandates an update to the MTCC as maintained by the client 120 at the time of the event 1525, typically by server 1502 passing information of the event such as MTC parameters 272 (e.g. focus change information, updated window size information or focus change request) and/or request for TBs to accommodate additional windows downstream to the client. Generally, upstream event 1525 is an event that originates at server 1502, or needs to go through server 1502, that will generate a change in an MTC parameter at the server and in which, due to the client's lack of visibility of the event 1525, corresponding or related MTC parameters at client 120 can't be updated without the server's interpretation of the event 1525 and/or communication of information of the event 1525. Examples of events not directly interpreted by the client include user input (via client 120 to applications on server 1502) such as turning on audio, scaling/zooming video or image player applications, starting or stopping an application that can change display priority or selecting items that will result in an application changing its display presentation at the client (e.g. new video size or new orientation). Other examples include application completion events. E.g. a user initiates a file search using a particular window (associated with a file search application) which is subsequently overlaid by other windows in use by the user while the file search proceeds. At completion of the search, event 1525 is an application completion event that moves the window associated with the file search back to the front. Other examples include timed events such as providing the user with periodic visual updates which may cause assigned windows to automatically fade in and out as configured. Other events 1525 are communicated to the server 1502 from sources other than client 120. For example, a second user associated with a second client or second server may interact with the user at client by communicating with server 1502. Such events might be associated with voice stream activity, video stream activity, mail protocol activity, stock tickers or unified communication signaling events.

The event 1525 might be a user interaction such as moving a mouse towards a window 'minimize' or 'maximize' control or an application software request to enter full screen mode which mandates the window changing to the size of the display for the application to render the image sequence to a visible image matching the size of the display. Actions such as closing or minimizing an application may require the application to interpret a requisite action needed such as waiting for a status message or interpreting the impact of window actions on the application. A user interaction event at the client 1504 may mandate application software or the operating system at server 1502 to interpret the user interaction event to determine if a change in z-order of the window or image region is required. Such a z-order change requires a corresponding update to the MTC parameters and MTCC. Examples of user interaction events include keyboard or mouse events. Such user input is generally either processed by the client 1504 with direct control over the MTCC or the user input is passed upstream (e.g. in the form of mouse events and co-ordinate information) to a target BN (i.e. a target server 1502). User events may also be distributed to child branches. Once user events have been passed upstream, they are processed by the target BN which responds by generating content that is communicated downstream with a content descriptor event. The content descriptor event is interpreted by an application of a downstream node or the client 1504 which sets its local MTC parameters 272 accordingly. As one particular example related to volume control, a BN translates a user input event (e.g. a mouse event) into a command (e.g. increase volume instruction) which is passed back to the client 1504 with image content such as a media stream.

Another example of the event 1525 is a presentation change event such as changing the scale of an application (e.g. full screen or 100% scale selection), a window closure (e.g. printer dialog closing on print job completion), opening a web page in a new window or an event initiated by the application to change the z-order of an existing window. Other examples of the event 1525 relate to voice changes associated with VoIP or video conferencing applications. For example a video conferencing application executing on a BN 110 may generate different windows associated with different user images, each window specified by MTC parameters 272. (In the case of some zero client embodiments of client 120, encoded video images associated with a client camera peripheral are composed at a BN 110). When a voice change event indicates that focus should change from a first window associated with a first user to a second window associated with a second user, the BN updates MTC parameters 272 (e.g. window size change) and sends a request to the client. Some external events relate to control and coordination communications between application software on different BNs which don't require client communication services. One example is a data clipboard service (cut, copy, paste, and the like) between BNs 110. A paste operation on a destination BN may prompt the user for a source preference (e.g. paste the most recent copy from the same BN, paste the most recent copy from a designated BN in schema 200 or paste the most recent copy from the set of BNs in the schema 200). As another example, a sequence of inter-BN events is used to co-ordinate which BN will execute a designated software application. For example, each BN may register available software applications with CM 150 or other BNs of schema 200. When a user selects an application icon (e.g. right-click mouse action), the user is provided an option to launch the application on a different BN which has the same application installed. The application may then be launched in a new window either in a seamless context of the desktop comprising the application icon or a new context associated with the invoked server. Other examples of event 1525 include particular changes in an audio stream associated with the image sequence (e.g. an audio stream instantiation or an audio volume change event that initiates a change in the z-order of an occluded window). A defined change in an audio stream such as a volume threshold or identified audio characteristic (e.g. identified by an audio filter) may be used to detect voice activity or other audio content of interest to a user. Such a defined change in the audio stream invokes a corresponding update to the MTC parameters. Other examples of event 1525 comprise server or application state change events such as completion of a user initiated activity (e.g. presentation of results by the application), a detection of a user-defined data value such as an application setting, rendering of a dialog box, notification event or event from the application in response to a user input received from the client. Other examples of event 1525 are described in association with step 1350 of the process 1300.

At step 1530, the server 1502 transmits an encoding of a second frame of the image sequence wherein an image area within the second frame is identified by the occluded portion in conjunction with information of the event required by the client to update the client held MTCC such as MTC parameters 272 defining a composition change request, focus change request, updated co-ordinates for a child window or request for downstream TBs to accept new window content. The encoding of the second frame includes region(s) identified by the MTCC as occluded portion(s). In an embodiment, the encoding and initiation of transmission at step 1530 is initiated prior to the server 1502 receiving an updated allocation of the display inclusive of the occluded portion; i.e. in an embodiment, server 1502 requests display of a new window such as a notification dialog which is hidden under a window from a contending server. Rather than requesting an update to the MTCC and then writing the dialog to the window once allocated by the client 1504, the server 1502 eliminates a round trip delay by transmitting the content for the new window together with a request to have the MTCC updated and the window displayed at the highest z-order. The client 1504 determines required changes to the display composition based on the received MTC parameters, including determining decode and display of occluded portion 810 based on TCR 290-1 and policies (e.g. client 1504 may display a notification window from the server 1502 covered by occluded area 810 or client 1504 may place the notification window in a different location or client 1504 may determine not to display a notification window due to a contending 'on top' window of higher priority from a different server) as indicated by MTC parameters related to the contending window.

At step 1540, the client 1504 may respond to the transmission of step 1530, for example by accepting or rejecting a request to update the MTCC, following which server 1502 transmits an encoding of a third frame including an update to the image area within the third frame identified by the occluded portion at step 1550 if the request is accepted, or, if the request is rejected, transmitting an encoding of a third frame without the occluded portion.

In some embodiments, the server 1502 presents itself as a client (i.e. an MTC client) to an upstream server (e.g. BN 110-2 upstream of 'MTC client' 110-1) and the upstream server renders, encodes and transmits the image sequence to server 1502 or directly to the client 120.

Figure 16:
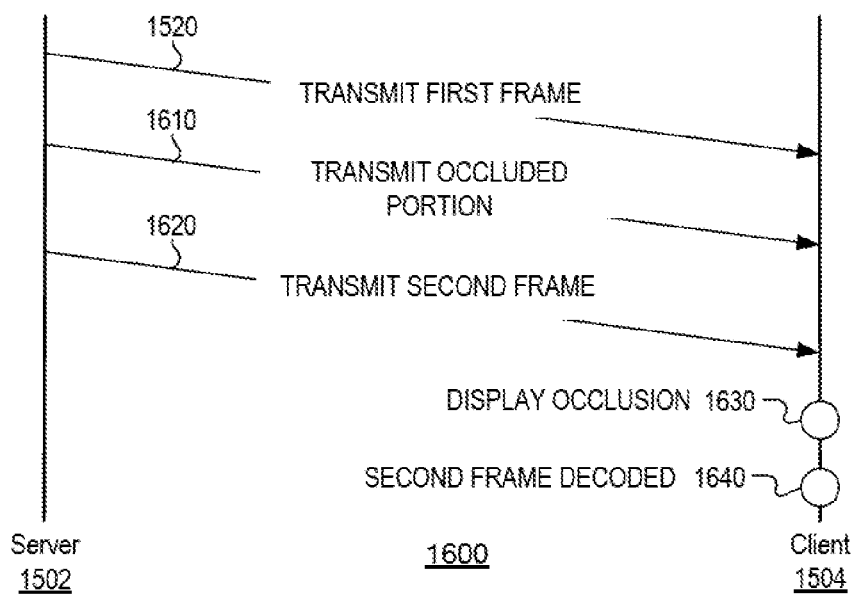
FIG. 16 illustrates a communications sequence in which a server transmits a first frame excluding an occluded portion and transmits an initial quality encoding of the occluded portion during a period of low bandwidth utilization.

FIG. 16 is an illustration of a communications sequence 1600 in which the server 1502 transmits a first frame excluding the occluded portion at step 1520 as for communication sequence 1500. At step 1610 server 1502 transmits an initial quality encoding of an area identified by the occluded portion during a period of low bandwidth utilization of the network session. At step 1620, a second frame and information of the event (e.g. MTCC update request) is transmitted. The client 1504 decodes and displays the initial quality encoding at time 1630 upon receiving information of the event which is prior to completing the decoding the second frame (i.e. the decoding of the second frame is completed at time 1640).

Figure 17:
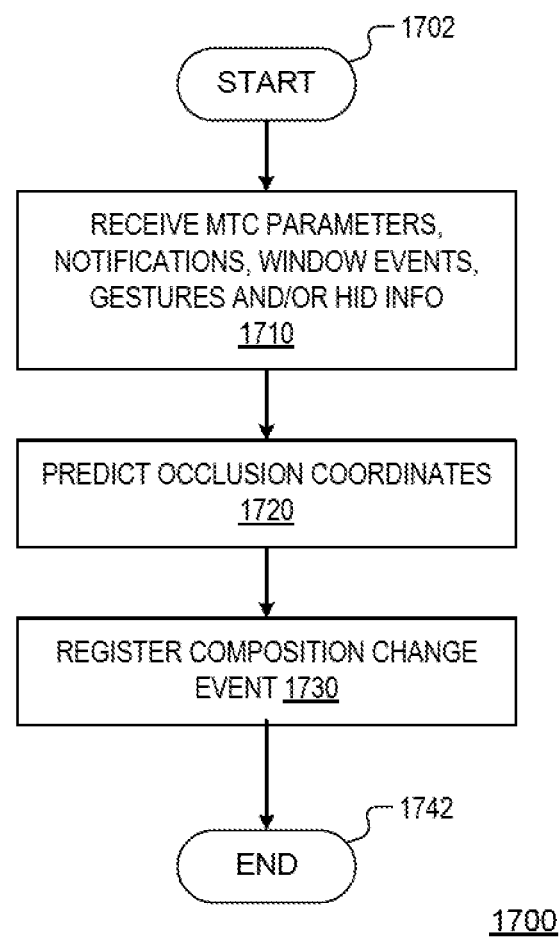
FIG. 17 illustrates a process executed by a branch node for responding to a change in parent composition by predicting a future occlusion.

FIG. 17 is an illustration of a process 1700 executed by a BN 110 for responding to a change in parent composition by predicting a future occlusion in accordance with one or more embodiments of the present invention. In an embodiment, process 1700 is performed as a subroutine of step 1350 in process 1300. Process 1700 starts at step 1702 and proceeds to step 1710. At step 1710 ("Receive MTC parameters, Notifications, Window Events, Gestures and/or HID Information"), the BN receives at least one of i) MTC parameters comprising coordinates for occluded regions, ii) window events (e.g. 'Maximize', 'Minimize', 'Close', 'Restore', or window focus status), iii) recent gesture information (e.g. Swipe, Pinch, Zoom), iv) HID information such as cursor location and/or cursor movement, v) motion vectors determined by the parent, vi) predicted occlusion coordinates determined by the parent, vii) a composition timing requirement determined by the parent (e.g. a request to delay a composition update by a specified number of frame periods) or viii) a notification message from a child node or the client 120 that a window transition or composition change is imminent.

At step 1720 ("Predict Occlusion") the information received at step 1710 is used to anticipate a future set of occlusion co-ordinates in association with optimum timing and encoding parameters for intermediary frame updates. As one example, an occlusion state machine is invoked to skip encoding of 10 transitional frames responsive to a window minimize event received from the parent. As another example, pixel updates associated with regions predicted to be revealed resultant from motion of an occluding window (i.e. trailing edge regions) are prioritized over pixel updates associated with regions predicted to be hidden resultant from the same motion (i.e. leading edge regions) for early transmission or higher quality encoding or higher frame rate encoding. Similarly, updates for regions of a window predicted to move off the client display surface due to motion or are deprioritized. As another example, image quality and update rate are locked at nominal values (e.g. perceptually legible quality at a reduced frame rate of 10 frames per second) to balance bandwidth consumption and interactivity during a window resize event (e.g. pinch, zoom, window resize). In an embodiment, multiple traversal paths for the occluding window are predicted, for example based on a traversal history. Multiple corresponding frame sequences are then generated and transmitted. The frames corresponding with an accurate prediction are displayed.

Process 1700 proceeds to step 1730 ("Register Composition Change Event") which registers an event for step 1350 to proceed to step 1330 (of the process 1300) following completion of process 1700. In cases where an occlusion state machine is active, composition may be delayed by a specified frame period. Process 1700 ends at step 1742, for example by returning to process 1330.

Figure 18:
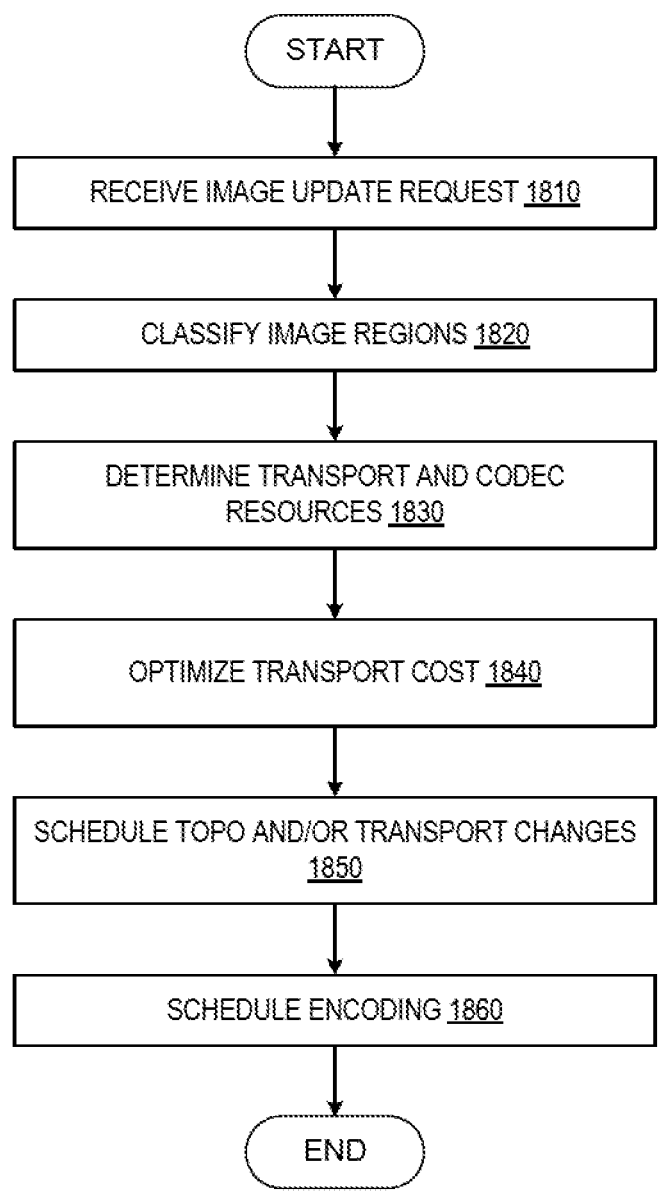
FIG. 18 illustration of a process for scheduling image encoding functions of a branch engine.

FIG. 18 is an illustration of a process 1800 for scheduling image encoding functions of a BE in accordance with one or more embodiments of the present invention. In an embodiment, process 1800 is an event-driven function performed as a subroutine of the step 1350 in process 1300. Various events may initiate process 1800 including system wide changes to schema 200 such as migration of BN functions, shutdown events, changes to the display composition 920 and on the like. As one example pertinent to bandwidth constrained systems where queuing delays should be minimized, the encoding of a particular frame anticipates the completion of the previous frame to ensure a constant stream of images at the allocated network bandwidth while also minimizing the depth of transmission queue for the current frame. As another example, changed user focus (e.g. focus on another window of the same BN or a different BN) may initiate a change in encoding schedule. Detection of keyboard and mouse input associated with a particular window generally indicates increased focus for that window in addition to decreased attention with respect to other windows. In an embodiment, client 120 provides BNs with focus information (e.g. during MTC parameter updates) which includes a list of level of attention for each window of the display composition.

Process 1800 starts at step 1802 and proceeds to step 1810 ("Receive Image Update Request"). Image update requests may be initiated at periodic intervals (e.g. at a desired frame rate) or responsive to pixel or display image changes received from the local BN or child BN or responsive to system changes such as following a child BN migration or change in session topology or responsive to a display update request received from a child BN (e.g. in conjunction with an image such as a pop-up overlay window received from a child BN). An image update request may be generated locally or received from a child or parent node, e.g. pop-up dialog box on the local node or a remote node and/or content changes may be identified via notifications from content generators or image change detection mechanisms. Image update requests may also be generated by quality refinement algorithms or external events such as media change events (e.g. resized child window), user input events or application events such as play/pause associated with a media stream.

Process 1800 proceeds to step 1820 ("Classify Image Regions") in which the display image is classified according to image visibility, probability of future visibility, transmission state and application type as defined by MTC parameters 272. At step 1830 ("Determine Transport and Codec Resources"), resource availability (e.g. encoder, decoder, GPU and CPU resource loading) and network availability (e.g. available bandwidth, current packet loss and current latency) are determined. In some embodiments, determination of resources further comprises determining a list of viable alternative resources useful to a transport cost analysis, for example by soliciting state requests from network components (e.g. routers, switches, CPUs, graphic processors) and other BN resources in system 100. In some embodiments, one or more codecs are selected from a set based on best match for the available network bandwidth. Content may be quantized when bandwidth is constrained but compressed using lossless encoding once network availability increases.

Process 1800 proceeds to step 1840 ("Optimize Transport Cost") in which BN 110 optimizes transport costs for the anticipated encoded image update. An embodiment of a transport cost optimization method is described by process 1900 (discussed further below). At step 1850 ("Schedule Topology and/or Transport Changes"), the control hierarchy, session topology, codec parameters and/or transport are reconfigured as described in steps 1310 and 1320 of the process 1300. In some embodiments, one or more alternative BNs are engaged in an alternative session topology as a consequence of transport cost optimization analysis at step 1840. Process 1800 proceeds to step 1860 ("Schedule Encoding") in which the BN 110 encodes and transmits the image according to priority determined during classification and cost optimization steps. Process 1800 ends at step 1862.

Figure 19:
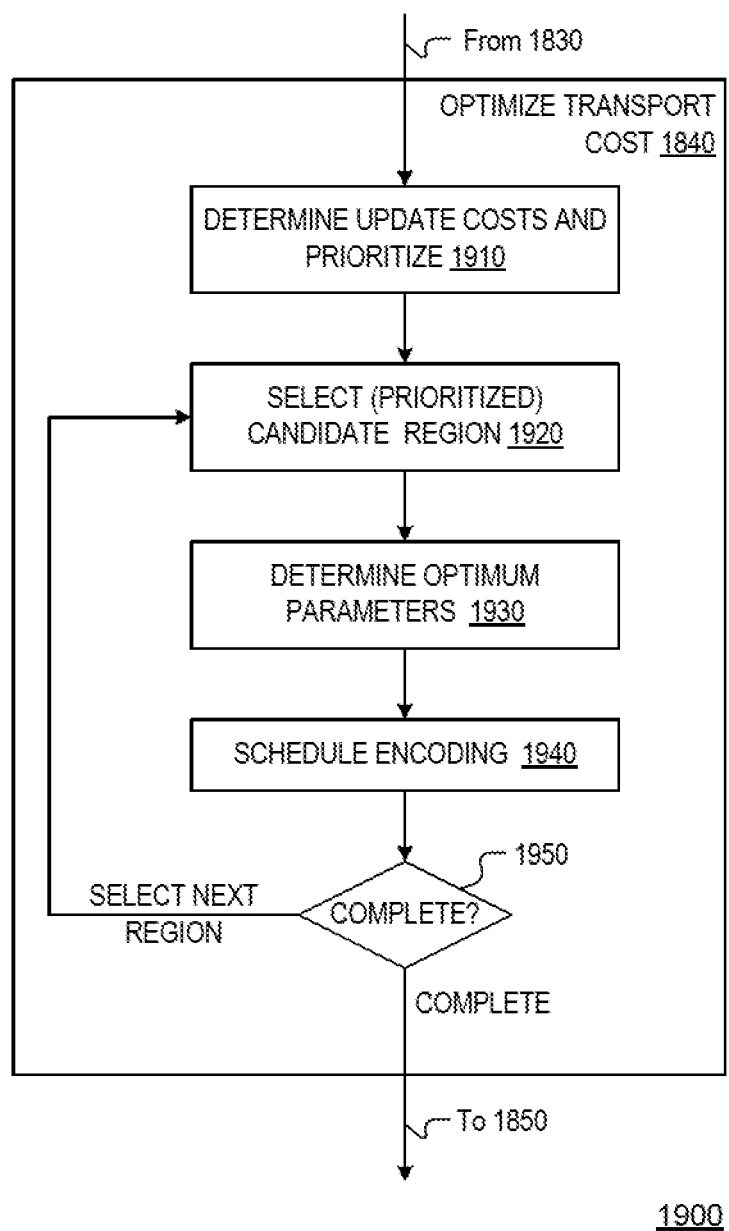
FIG. 19 illustrates a process for optimizing transport cost.

FIG. 19 is an illustration of process 1900 for optimizing transport cost in accordance with one or more embodiments of the present invention. Process 1900 is an embodiment of step 1840 in process 1800. Process 1900 starts from step 1830 (FIG. 18) and proceeds to step 1910 ("Determine Update Costs") in which network bandwidth and processing costs (e.g. encoder and decoder costs) are determined for regions requiring update. Transmission bandwidth and encoding requirements for each region may be estimated according to image type (e.g. text type, background type, video type, natural image type) or application type and image quality policies. In some embodiments, a trial encoding of a region is performed to assist in the determination of bandwidth requirements. In other embodiments, resources from multiple BNs are evaluated as options to overcome constraints (e.g. concurrent transmission from multiple servers to a client to overcome narrowband wireless constraints). In other embodiments, a quality index is used to normalize the transport cost in relation to other branches. Regions are prioritized according to MTC parameters 272. In an embodiment, non-occluded, in-focus and non-current regions receive the highest priority, regions predicted to be revealed receive high priority, out-of-focus, low alpha or high z-order regions and those requiring quality improvements receive medium priority, regions predicted to be occluded receive low priority and occluded regions receive the lowest priority. Other prioritization schemes may be implemented dependent on security, resource utilization, visibility and image quality policies.

Process 1900 proceeds to step 1920 ("Select Candidate Region") in which the highest priority region yet to be updated is selected for encoding. For example, in the first iteration of step 1920, the oldest non-current changed region or predicted to change region is selected and the priority list is traversed in subsequent iterations. At step 1930 ("Determine Optimum Parameters"), the transmission path (including schema, session topology and parameters for composition, transport and encoding) is selected by evaluating alternative schemes and parameters with a view to delivering an image quality objective under specified bandwidth, latency and resource utilization constraints. As one example, a session topology may be reconfigured at step 1930 to redirect a region associated with an encoded media stream (e.g. H.264 video) to a client 120 (rather than transcoding at the BN 110 between video and remote desktop compression formats). As another example, media stream decoding may fall back from client 120 to a BN (or vice versa) based on a change in CPU or memory resources at the client or the BN or change in application type or image type of the media itself.

At step 1940 ("Schedule Encoding"), the candidate region is scheduled for encoding and transmission. At step 1950, process 1900 evaluates whether to process the next candidate image region by returning to step 1920 or complete processing by continuing to step 1850 (FIG. 18).

Figure 20:
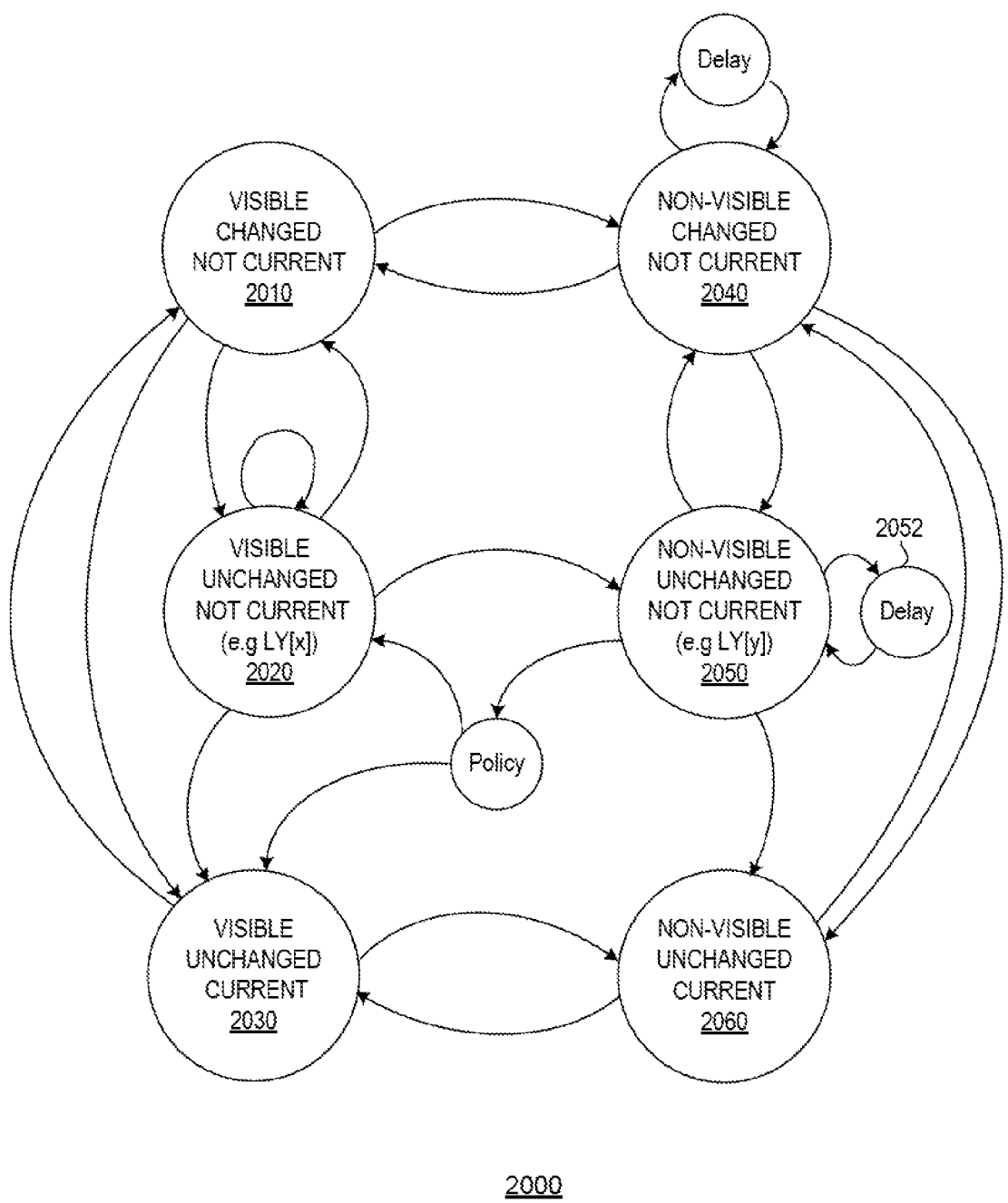
FIG. 20 illustrates a set of visibility states for an image region at a branch node.

FIG. 20 illustrates a set of visibility states 2000 for an image region at a BN 110 according to an exemplary set of session policies in accordance with one or more embodiments of the present invention. State information for branch and parent nodes is typically synchronized using MTC parameters 272 for the BN 110 to maintain a view of the display composition at client 120.

During state 2010, the source image associated with the image region is visible (i.e. not occluded) and has changed since previously updated from BN 110 (or a media source) to client 120. Consequently, the image region is not current at client 120. BN 110 prioritizes image updates (ref. process 1800). If the image region is encoded as a reduced quality facsimile of the source image, the state for the image region proceeds to state 2020. Image improvements are encoded and transmitted (e.g. using progressive image transmission techniques) resulting in loopbacks on state 2020 until the image region at the client 120 either exactly matches the source image region or meets acceptable quality criteria in which case the state of the image region eventually progresses to state 2030. If the visible unchanged region at state 2020 becomes hidden, it proceeds to state 2050. In some embodiments, for example when an image region comprises text images which require lossless encoding, the state of the region may advance from state 2010 directly to state 2030. If the source image changes while at state 2020 or 2030, the image at client 120 is no longer current and the state for the region reverts to state 2010.

If a changed image region becomes non-visible (i.e. occluded by another window at client 120), the region moves from state 2010 to state 2040 (and back from state 2040 to state 2010 if a changed non-visible region at state 2040 becomes visible). Dependent on bandwidth preservation policies, the region may maintain state 2040 (i.e. no updates of occluded regions) until it is no longer occluded or reduce the frequency at which a change in source image is checked by periodically engaging delay state 2042. Such an approach ensures that content with a high source change frequency (e.g. video) may be transmitted to the client at a reduced frame rate and reduced bandwidth consumption while also ensuring that content with a low frame rate may be cached at the client 120. If policies permit updates for occluded image regions, state 2040 proceeds to state 2050 following transmission of a reduced quality facsimile or proceeds to state 2060 following transmission of an acceptable final facsimile of the source image. When at a reduced quality state 2050, delay state 2052 may be engaged to preserve resource consumption by delaying quality improvements until the region is finally current in which case it proceeds to state 2060 (non-visible, unchanged and current) or the region changes in which case it reverts to state 2040. If a non-visible and current region at state 2060 changes, it reverts to state 2040 and if the non-visible and current region at state 2060 becomes visible, it proceeds to state 2030.

If a non-current and occluded image region (i.e. state 2050) is made visible (e.g. an occluding window at client 120 is removed), the manner in which the image region is displayed at client 120 is determined by policy state 2054. If policies mandate tight control over image currency (e.g. display of financial, medical or engineering data images) or high latency environments, the image region proceeds to state 2030 only after reaching an acceptable current state (e.g. lossless reproduction) which is then made visible. In an embodiment, the display region may be 'greyed out' at step 2054 until the client has been provided a current update for the image region. If policies permit the display of lossy facsimiles, such as low-latency networks or non-critical use cases, the image region proceeds from state 2054 to state 2020 in which the update state achieved at state 2050 is made visible.

FIG. 21 is an illustration of a communications sequence 2100 associated with an image composition synchronization process in accordance with one or more embodiments of the present invention. Communication sequence 2100 synchronizes MTC parameters 272 of a desktop associated with one BN 110 with content from a second node such as a BN 110 or a media source 130.

At step 2110, a first desktop image is rendered by the first node 2104 and communicated to the client 2102 via a first session established between the first node 2104 and the client 2102. The first desktop image is displayed by the client 2102.

At step 2112, an application request is communicated between the first node 2104 and a second node 2106, via a second session. In an embodiment, the application request comprises a request to launch a software application at node 2106 or a request for a media server to play a file such as a video file.

At step 2120, node 2106 renders an application image such as a video frame in response to the application request received at step 2112, following which the application image is communicated from node 2106 to client 2102 via a third session at step 2122 and dimensions of the application image as determined by the second node 2106 are communicated to the first node 2104 in the form of MTC parameters 272 via the second session at step 2124.

At step 2126, a second desktop image rendered in response to the dimensions (i.e. an updated desktop that accounts for the MTC parameters 272 received at step 2124) is communicated via the first session from the first node 2104 to the client 2102. The client 2102 delays the display of the application image until step 2130; the delay period 2132 commences when the application image is received at step 2122 and proceeds until client 2102 has received the second desktop image associated with step 2126 and composed it with the application image for display at step 2130. In one alternative embodiment, the delay is initiated in response to composition instructions received from the second node 2106 via the third session. In another alternative embodiment, the delay is initiated in response to composition instructions received from the first node 2104.

At step 2140, a user input command such as a mouse event is communicated from the client 2102 to the first node 2104 to change the dimensions of the window associated with the application image. A third desktop image is rendered at step 2142 in response to the user input command (i.e. adjusted window dimensions) and communicated to the client 2102 via the first session at step 2144.

At step 2146, an application request is communicated between the first node 2104 and the second node 2106, via the second session to change the dimensions of the application image. The second node 2106 adjusts the application image at step 2150. At step 2152, an update image to the application image rendered by the second node 2106 is communicated via the third session to the client 2102. The client 2102 delays the display of the updated application image until step 2160; the delay period 2162 commences when the updated application image transmitted at step 2152 has been received and proceeds until client 2102 has received the third desktop image associated with step 2144 and composed it with the application image for display at step 2160. In one alternative embodiment, the delay is initiated in response to composition instructions received from the second node 2106 via the third session. In another alternative embodiment, the delay is initiated in response to composition instructions received from the first node 2104.

While the foregoing is directed to embodiments of the present invention, other and further embodiments of the invention may be devised without departing from the basic scope thereof, and the scope thereof is determined by the claims that follow.

The invention claimed is:

1. A method for communicating an image stream, comprising:
   negotiating, by a server, with a client computer, via a network session, a media transport and composition configuration (MTCC) by exchanging co-ordinates, sizing and priorities of display windows to identify (i) a window as a portion of a display of the client computer and (ii) an occluded portion of the window, wherein occlusion of the occluded portion is controlled by the client computer;
   generating, by the server and in compliance with the MTCC, a sequence of image frames, wherein each image frame of the sequence of image frames comprises pixel data in a portion of the image frame identified by the occluded portion;
   transmitting, via the network session, an encoding of a first frame of the sequence of image frames, wherein the encoding of the first frame does not include an encoding of the pixel data in the portion of the first frame identified by the occluded portion;
   identifying, by the server, an event associated with the sequence of image frames; and
   transmitting, by the server to the client computer, information of the event in conjunction with an encoding of a second frame of the sequence of image frames to reduce event response latency, wherein the encoding of the second frame includes an encoding of the pixel data in the portion of the second frame identified by the occluded portion, wherein transmitting the information of the event occurs prior to any other communication between the server and the client computer regarding the event, and wherein the client computer composes and displays a display of the sequence of image frames according to the information of the event; and
   receiving, at the server, an acknowledgement of the event, from the client after a round trip delay,
   wherein transmitting the information of the event in conjunction with the encoding of a second frame and prior to the reception of the acknowledgement at the server reduces a displayed response latency to the event by the client computer by at least the round trip delay as compared to transmitting an encoding of the occluded portion of the second frame subsequent to receiving the acknowledgement at the server.

2. The method of claim 1, wherein negotiating the MTCC comprises the client computer allocating the window, exclusive of the occluded portion, to the server; and wherein transmitting the encoding of the second frame is initiated, (i) in response to identifying the event and (ii) prior to the server receiving an updated allocation of the display inclusive of the occluded portion.

3. The method of claim 2, further comprising:
   receiving, by the server, a response to transmitting the information; and
   transmitting, to the client computer, an encoding of a third frame of the sequence of image frames, wherein the encoding of the third frame selectively includes, based on the response, an encoding of the pixel data of the third frame.

4. The method of claim 1, wherein the information comprises an update to media transport and composition (MTC) parameters of the window; and wherein the client computer determines, based on the information and MTC parameters of a second window, a display of a decoding of the encoding of the second frame, wherein negotiating the MTCC is based on the MTC parameters of the window.

5. The method of claim 1, wherein negotiating the MTCC comprises negotiating an image size of the window and wherein the sequence of image frames is rendered to the image size.

6. The method of claim 1, wherein the event is an upstream event received by the server and wherein the server is required to pass the information of the event downstream to the client computer to update the MTCC.

7. The method of claim 1, wherein the portion of the display is a sub-portion of an overall display dimension of the display.

8. The method of claim 1, wherein the event is a request, from an application rendering the sequence of image frames, to change to a full screen mode, and wherein the information comprises a change of the window to a visible image size of the display.

9. The method of claim 1, wherein the event is at least one of:
   a user interaction;
   a defined change in an audio stream associated with the sequence of image frames;
   a user input provided with content of the sequence of image frames; or
   a change in an application generating the sequence of image frames, the change in the application comprising at least one of:
   a completion of a user-initiated activity;
   a detection of a user-defined data value;
   a rendering of a dialog box; or
   an event, from the application generating the sequence of image frames, in response to a user input received from the client computer.

10. The method of claim 1, wherein (a) the server presents itself as an media transport and composition (MTC) client to an upstream server, and (b) the upstream server renders, encodes and transmits an encoding of an image sequence; and wherein generating the sequence of image frames comprises decoding the encoding of the image sequence.

11. The method of claim 1, wherein during a period of defined bandwidth utilization of an available bandwidth of the network session, the client computer transmits an initial quality encoding of a frame of the sequence of image frames and wherein the client computer displays a decoding of the initial quality encoding upon receiving the information of the event and prior to completing a decoding of the encoding of the second frame.

12. The method of claim 1, wherein negotiating the MTCC comprises the client computer referencing a prior MTCC resulting from a user interaction.

13. The method of claim 1, wherein negotiating the MTCC comprises the server adjusting and communicating first media transport and composition (MTC) parameters, based on second MTC parameters, wherein first MTC parameters are associated with the server, and the second MTC parameters are received from the client computer and associated with a second server.

14. The method of claim 1, wherein transmitting the encoding of the first frame is based on the MTCC; wherein the server identifies the event subsequent to transmitting the encoding of the first frame; and wherein transmitting the information is based on the MTCC and the event.

\* \* \* \* \*